US011283612B2

(12) United States Patent
Tsuchida et al.

(10) Patent No.: US 11,283,612 B2
(45) Date of Patent: Mar. 22, 2022

(54) INFORMATION PROCESSING DEVICE, VERIFICATION DEVICE, AND INFORMATION PROCESSING SYSTEM

(71) Applicant: NEC Corporation, Tokyo (JP)

(72) Inventors: Hikaru Tsuchida, Tokyo (JP); Kengo Mori, Tokyo (JP); Toshiyuki Isshiki, Tokyo (JP)

(73) Assignee: NEC CORPORATION, Tokyo (JP)

( * ) Notice: Subject to any disclaimer, the term of this patent is extended or adjusted under 35 U.S.C. 154(b) by 223 days.

(21) Appl. No.: 16/609,502

(22) PCT Filed: May 30, 2017

(86) PCT No.: PCT/JP2017/019989
§ 371 (c)(1),
(2) Date: Oct. 30, 2019

(87) PCT Pub. No.: WO2018/220693
PCT Pub. Date: Dec. 6, 2018

(65) Prior Publication Data
US 2020/0145212 A1 May 7, 2020

(51) Int. Cl.
*H04L 9/32* (2006.01)
*H04L 9/08* (2006.01)
*H04L 29/06* (2006.01)

(52) U.S. Cl.
CPC .......... *H04L 9/3213* (2013.01); *H04L 9/0872* (2013.01); *H04L 9/3236* (2013.01);
(Continued)

(58) Field of Classification Search
CPC ... H04L 9/3213; H04L 9/0872; H04L 9/3236; H04L 9/3247; H04L 63/10;
(Continued)

(56) References Cited

U.S. PATENT DOCUMENTS 8,132,242 B1 * 3/2012 Wu ..................... H04L 63/0884
726/8
10,171,463 B1 * 1/2019 Wiger ..................... H04L 63/08
(Continued)

FOREIGN PATENT DOCUMENTS

JP 2003-022253 A 1/2003
JP 2007206961 A 8/2007
(Continued)

OTHER PUBLICATIONS

Bellare, M., et al., "Keying Hash Functions for Message Authentication" Annual International Cryptology Conference, Advances in Cryptology, CRYPTO '96, LNCS 1109, pp. 1-15 (19 pages).
(Continued)

*Primary Examiner* — Matthew Smithers

(57) ABSTRACT

An information processing device according to the present invention includes: a memory storing instructions; and at least one processor configured to execute the instructions to perform: acquiring a first time; generating, based on the first time, a term of validity of a first access token, and generating a policy including the first access token, the term of validity, and identification information of a receiver of the first access token; generating a digital signature, based on the policy; generating a second access token including the policy and the digital signature; and transmitting the second access token to another device.

5 Claims, 18 Drawing Sheets

(52) U.S. Cl.
CPC ............ *H04L 9/3247* (2013.01); *H04L 63/10* (2013.01); *H04L 2209/38* (2013.01)

(58) Field of Classification Search
CPC . H04L 2209/38; H04L 63/126; H04L 63/108; H04L 9/088; G06F 21/45; G06F 21/33
See application file for complete search history.

(56) References Cited

U.S. PATENT DOCUMENTS

| | | | |
|---|---|---|---|
| 2003/0005333 A1 | 1/2003 | Noguchi et al. | |
| 2004/0054919 A1* | 3/2004 | Duri | G06Q 40/02 726/1 |
| 2004/0073801 A1* | 4/2004 | Kalogridis | G06F 21/305 713/176 |
| 2004/0117623 A1* | 6/2004 | Kalogridis | H04L 9/3297 713/165 |
| 2006/0080546 A1* | 4/2006 | Brannon | H04L 9/3239 713/185 |
| 2014/0020051 A1* | 1/2014 | Lu | G06F 21/6218 726/1 |
| 2014/0189775 A1* | 7/2014 | Burch | H04L 63/0428 726/1 |
| 2015/0117217 A1* | 4/2015 | Stallard | H04L 47/24 370/236 |
| 2015/0156024 A1* | 6/2015 | De Los Santos | H04L 9/3268 713/176 |
| 2015/0334099 A1* | 11/2015 | Zhang | G06F 21/73 726/6 |
| 2016/0014119 A1* | 1/2016 | Inoue | H04L 63/0807 726/9 |
| 2016/0072839 A1* | 3/2016 | Mortimore, Jr. | H04L 63/20 726/1 |
| 2016/0127330 A1 | 5/2016 | Roth et al. | |
| 2017/0230307 A1* | 8/2017 | Li | H04W 4/70 |
| 2017/0262659 A1* | 9/2017 | Kuris | H04L 63/0428 |
| 2017/0346807 A1* | 11/2017 | Blasi | G06F 21/105 |
| 2018/0139205 A1* | 5/2018 | Devaney | H04L 63/101 |
| 2019/0007212 A1* | 1/2019 | Neve de Mevergnies | G06F 21/6218 |
| 2020/0177389 A1* | 6/2020 | Tsuchida | H04L 9/3234 |

FOREIGN PATENT DOCUMENTS

| | | |
|---|---|---|
| JP | 2007226470 A | 9/2007 |
| JP | 2008219266 A | 9/2008 |
| JP | 2012164191 A | 8/2012 |
| JP | 2012238036 A | 12/2012 |
| JP | 2016130973 A | 7/2016 |
| JP | 2016535880 A | 11/2016 |
| JP | 2017004115 A | 1/2017 |
| WO | 2017002496 A1 | 1/2017 |

OTHER PUBLICATIONS

Bray, T., "The JavaScript Object Notation (JSON) Data Interchange Format", (Request for Comments: 7159), Internet Engineering Task Force (IETF), Mar. 2014, pp. 1-16.
Berners-Lee, T., et al., " Uniform Resource Identifier (URI): Generic Syntax", (Request for Comments: 3986) Network Working Group, 2005, pp. 1-61.
Barth, A., "HTTP State Management Mechanism", (Request for Comments: 6265), Internet Engineering Task Force (IETF), 2011, pp. 1-37.
National Institute of Standards and Technology (NIST), "Advanced Encryption Standard (AES)", Federal Information Processing Standards Publication 197 (FIPS 197), 2001, 51 pages total.
International Search Report dated Sep. 5, 2017 from the International Bureau in application No. PCT/JP2017/019989.
Written Opinion dated Sep. 5, 2017, from the International Bureau in application No. PCT/JP2017/019989.
Ozeki, H., et al., "Privacy Enhanced Distributed and Cooperative Mechanism ", Proceedings of DBWeb, 2003 (2004), vol. 2003 (vol. 45), No. SIG 7 (No. 18)(TOD 22), pp. 85-92 (pp. 155-162).
Ellison, C., et al., "SPKI Certificate Theory", IETF RFC 2693, Sep. 1999, Abstract, Sections 1., 6.1, https://www.rfc-editor.org/rfc/pdfrfc/rfc2693.txt.pdf, pp. 1-43.
Japanese Office Action for JP Application No. 2019-521555 dated May 19, 2020 with English Translation.

\* cited by examiner

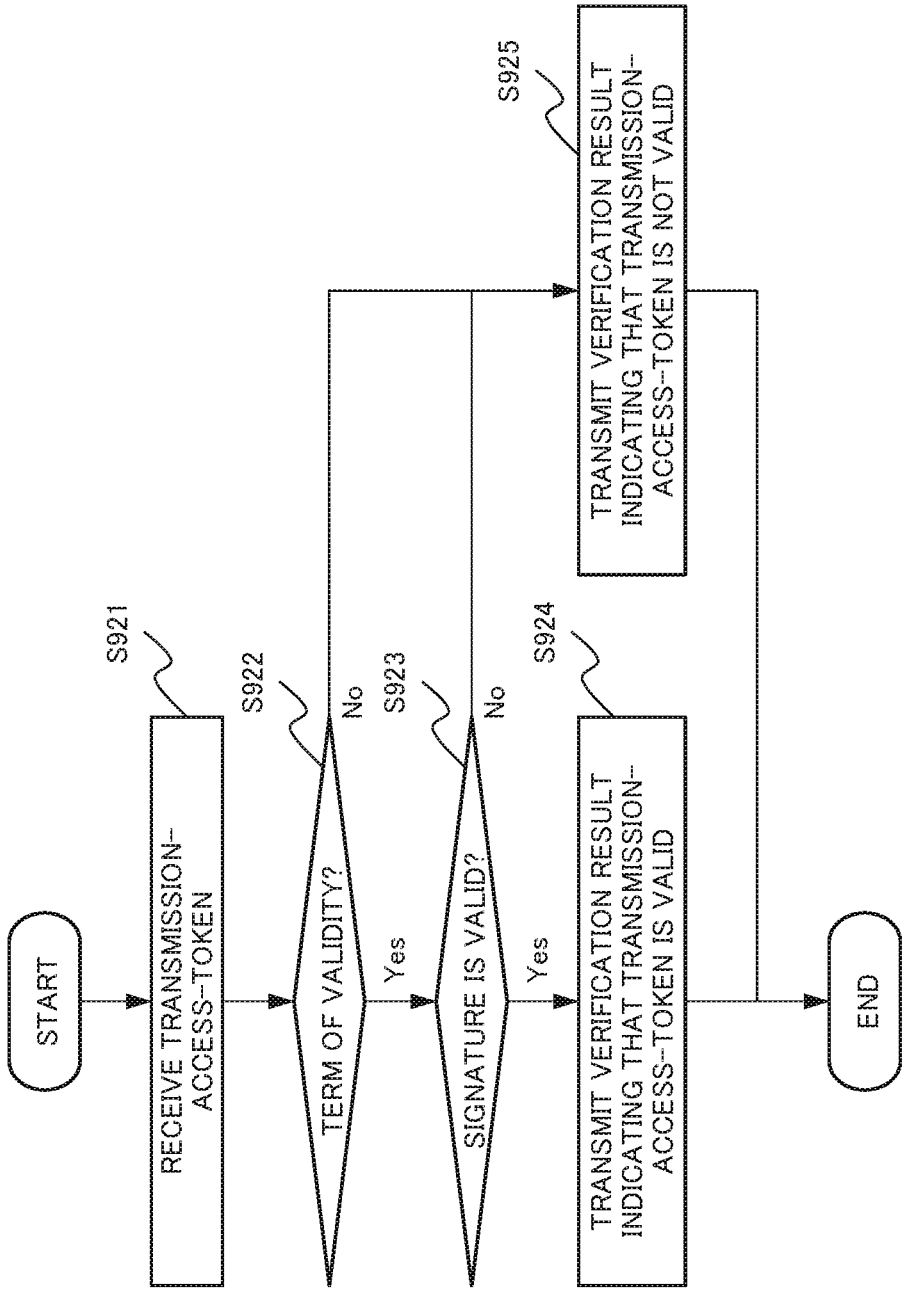

INFORMATION PROCESSING DEVICE, VERIFICATION DEVICE, AND INFORMATION PROCESSING SYSTEM

This application is a National Stage Entry of PCT/JP2017/019989 filed on May 30, 2017, the contents of all of which are incorporated herein by reference, in their entirety.

TECHNICAL FIELD

The present invention relates to processing of information, and particularly, relates to an information processing device and the like which process authority of access.

BACKGROUND ART

As a scheme for securely achieving transfer of authority relating to a resource in a system, there is a system (e.g., see Patent Literatures (PTLs) 1 to 5) using an access token being authentication information. For example, there is a case where, in an infrastructure as a service (IaaS) providing an infrastructure of a computer system as a service, authority needs to be delegated to a user outside the system. In such a case, authority is delegated by use of an access token system.

For example, in an invention described in PTL 1, authority is delegated as follows. First, an access token system generates an access token (hereinafter, referred to as an "original-access-token") relating to authority of access to a target resource. Further, the access token system generates a term of validity of the generated original-access-token. Then, the access token system generates a digital signature, based on a policy (generally, generated by use of a character string) linking the original-access-token to the term of validity. Then, the access token system passes, to a delegation destination (e.g., a user) of the authority, data (hereinafter, referred to as a "transmission-access-token") linking the policy to the digital signature. The delegation destination acquires authority relating to the resource delegated by use of the transmission-access-token, and executes processing using the resource.

FIG. 16 is a block diagram illustrating one example of a configuration of a general access token system 900.

The access token system 900 includes a generation device 920, a verification device 930, a network 940, a delegation destination device 950, and a resource management device 960.

The network 940 is a communication path which mediates transmission and reception of data between the devices.

The generation device 920 generates or acquires an original-access-token relating to a resource. Further, the generation device 920 acquires a time, and generates a term of validity, based on the time. Then, the generation device 920 generates a policy by use of the original-access-token and the term of validity. Then, the generation device 920 generates a digital signature from the policy by use of a previously stored signing key used for a digital signature. Then, the generation device 920 generates, from the policy and the digital signature, a transmission-access-token to be transmitted to the delegation destination device 950, and transmits the transmission-access-token to the delegation destination device 950.

An operation of the generation device 920 is described with reference to a drawing.

FIG. 17 is a flowchart for describing an operation of the general generation device 920.

The generation device 920 acquires an original-access-token for a resource to be a target for delegating authority (step S911).

Next, the generation device 920 generates a term of validity of the original-access-token (step S912).

Further, the generation device 920 generates a policy by use of the original-access-token and the term of validity (step S913).

Then, the generation device 920 generates a digital signature, based on a signing key and the policy (step S914).

Then, the generation device 920 generates a transmission-access-token, based on the policy and the digital signature (step S915).

The generation device 920 transmits the transmission-access-token to the delegation destination device 950 (step S916).

The delegation destination device 950 transmits the received transmission-access-token to the resource management device 960 when utilizing a resource managed by the resource management device 960.

When receiving the transmission-access-token, the resource management device 960 transmits the transmission-access-token to the verification device 930, and requests verification of the transmission-access-token. Then, when a verification result by the verification device 930 is valid, the resource management device 960 permits the delegation destination device 950 to utilize the resource.

The verification device 930 previously stores a verification key used for verification. Then, the verification device 930 acquires a time at which the verification is performed. Then, the verification device 930 verifies validity of the received transmission-access-token by use of the verification key and the time.

FIG. 18 is a flowchart for describing an operation of the general verification device 930.

The verification device 930 receives a transmission-access-token (step S921).

The verification device 930 determines, by use of a current time and a term of validity which is included in the transmission-access-token, whether or not the transmission-access-token is within the term of validity (step S922).

When the term is valid (Yes in step S922), the verification device 930 verifies whether or not a digital signature included in the transmission-access-token is valid (step S923).

When the digital signature is valid (Yes in step S923), the verification device 930 transmits a verification result indicating that the transmission-access-token is valid (step S924).

When the term is not valid (No in step S922), or when the digital signature is not valid (No in step S923), the verification device 930 transmits a verification result indicating that the transmission-access-token is not valid (step S925).

In this way, the general access token system 900 delegates authority of access to a resource by use of an access token.

PTL 2 discloses a technique of preventing impersonation.

PTL 3 discloses a technique relating to authority of another application for executing setting change of a certain application.

PTL 4 discloses a technique for achieving, by use of a plurality of pieces of authentication information relating to a user, access which does not disclose personal information of a user.

PTL 5 discloses a technique of generating an authentication token for single sign-on.

Note that Non Patent Literatures (NPLs) 1 to 5 are literatures disclosing techniques used for description of an example embodiment.

CITATION LIST

Patent Literature (PTL)

[PTL 1] Specification of U.S. Unexamined Patent Application Publication No. 2016/0127330
[PTL 2] Japanese Unexamined Patent Application Publication No. 2017-004115
[PTL 3] Japanese Unexamined Patent Application Publication No. 2016-130973
[PTL 4] Japanese Unexamined Patent Application Publication No. 2012-164191
[PTL 5] Japanese Unexamined Patent Application Publication No. 2008-219266

Non Patent Literature (NPL)

[NPL 1] Mihir Bellare, Ran Canetti, and Hugo Krawczyk, "Keying Hash Functions for Message Authentication", Annual International Cryptology Conference, Springer Berlin Heidelberg, Advances in Cryptology—CRYPTO '96, LNCS 1109, pp. 1 to 15, 1996.
[NPL 2] T. Bray, "The JavaScript Object Notation (JSON) Data Interchange Format" (Request for Comments: 7159), Internet Engineering Task Force (IETF), March, 2014.
[NPL 3] T. Berners-Lee, R. Fielding, L. Masinter "Uniform Resource Identifier (URI): Generic Syntax", (Request for Comments: 3986), Network Working Group, January, 2005.
[NPL 4] A. Barth, "HTTP State Management Mechanism", (Request for Comments: 6265), Internet Engineering Task Force (IETF), April, 2011.
[NPL 5] National Institute of Standards and Technology (NIST), "Advanced Encryption Standard (AES)", Federal Information Processing Standards Publication 197 (FIPS 197), Nov. 26, 2001.

SUMMARY OF INVENTION

Technical Problem

An access token is transmitted and received among devices included in an access token system. Moreover, a network among devices is configured by use of a plurality of devices. Thus, a case where a device operated by a malicious person is included in the access token system is assumed. In other words, there is a possibility that a regular access token is received by a malicious person.

There is a possibility that a malicious receiver attempts false delegation of authority by use of the received access token.

One countermeasure against this is to shorten a term of validity of an access token. Shortening a term of validity of an access token shortens a period in which a malicious receiver can falsely delegate authority by use of a received access token, and lessens damage.

However, shortening a term of validity shortens an available period of an access token. As a result, for example, generation of many access tokens is required. In other words, shortening a term of validity deteriorates convenience.

Accordingly, in order to prevent false use of an access token without deteriorating convenience, a technique for verifying false use of an access token is desired. Detection of an access token having false contents (e.g., an access token having an expired term of validity or having an invalid digital signature) is already performed. Thus, a technique for verifying an access token, which has proper contents (e.g., an access token having a valid term of validity and a valid digital signature) and is sent by a false receiver, is particularly desired. In other words, a technique desired herein is not a technique for detecting whether or not contents of an access token are valid, but a technique for verifying that a proper access token is transmitted by a proper receiver. Moreover, a technique for, when a proper access token is falsely transmitted, identifying a proper receiver of the transmitted access token is also desired.

PTLs 1 to 5 disclose the techniques for detecting whether or not authentication information is false in contents, in relation to authentication information (e.g., an access token) relating to delegation of authority as in the access token system described above. However, PTLs 1 to 5 do not disclose any techniques for verifying that a proper access token is transmitted by a proper receiver. Moreover, PTLs 1 to 5 do not disclose any techniques for, when a proper access token is falsely transmitted, identifying a proper receiver of the transmitted access token.

In other words, the techniques described in PTLs 1 to 5 have an issue of being unable to verify, in an access token system, whether an access token is transmitted from a proper receiver. In addition, the techniques described in PTLs 1 to 5 have an issue of being unable to identify, when a proper access token is falsely transmitted, a proper receiver of the transmitted access token.

An object of the present invention is to solve the issues described above, and to provide an information processing device which generates an access token enabling verification of whether or not distribution is distribution from a proper receiver, a verification device which verifies false distribution of an access token, and/or the like.

Solution to Problem

An information processing device according to one aspect of the present invention includes:
a memory storing instructions; and
at least one processor configured to execute the instructions to perform:
acquiring a first time;
generating, based on the first time, a term of validity of a first access token, and generating a policy including the first access token, the term of validity, and identification information of a receiver of the first access token;
generating a digital signature, based on the policy;
generating a second access token including the policy and the digital signature; and
transmitting the second access token to another device.

A verification device according to one aspect of the present invention includes:
a memory storing instructions; and
at least one processor configured to execute the instructions to perform:
receiving second access; token from another device;
acquiring a second time;
determining, based on a term of validity included in the second access token and the second time, whether or not the second access token is valid;

determining, based on a digital signature included in the second access token, whether or not the second access token is valid; and determining, based on identification information included in the second access token, whether or not the second access token is falsely distributed.

A information processing system according to one aspect of the present invention includes the above-mentioned information processing device and the above-mentioned verification device.

An information processing method according one aspect of the present invention includes:

acquiring a first time;

generating, based on the first time, a term of validity of a first access token, and generating a policy including the first access token, the term of validity, and identification information of a receiver of the first access token;

generating a digital signature, based on the policy;

generating a second access token including the policy and the digital signature; and transmitting the second access token.

A recording medium according one aspect of the present invention computer-readably stores a program. The program causes a computer to execute:

a process of acquiring a first time;

a process of generating, based on the first time, a term of validity of a first access token, and generating a policy including the first access token, the term of validity, and identification information of a receiver of the first access token;

a process of generating a digital signature, based on the policy;

a process of generating a second access token including the policy and the digital signature; and a process of transmitting the second access token.

Advantageous Effects of Invention

Based on the present invention, it is possible to provide an advantageous effect of generating an access token enabling verification of whether or not distribution is distribution from a proper receiver, or verifying false distribution of an access token.

BRIEF DESCRIPTION OF DRAWINGS

FIG. 18 is a flowchart for describing an operation of a general verification device.

EXAMPLE EMBODIMENT

Figure 1:
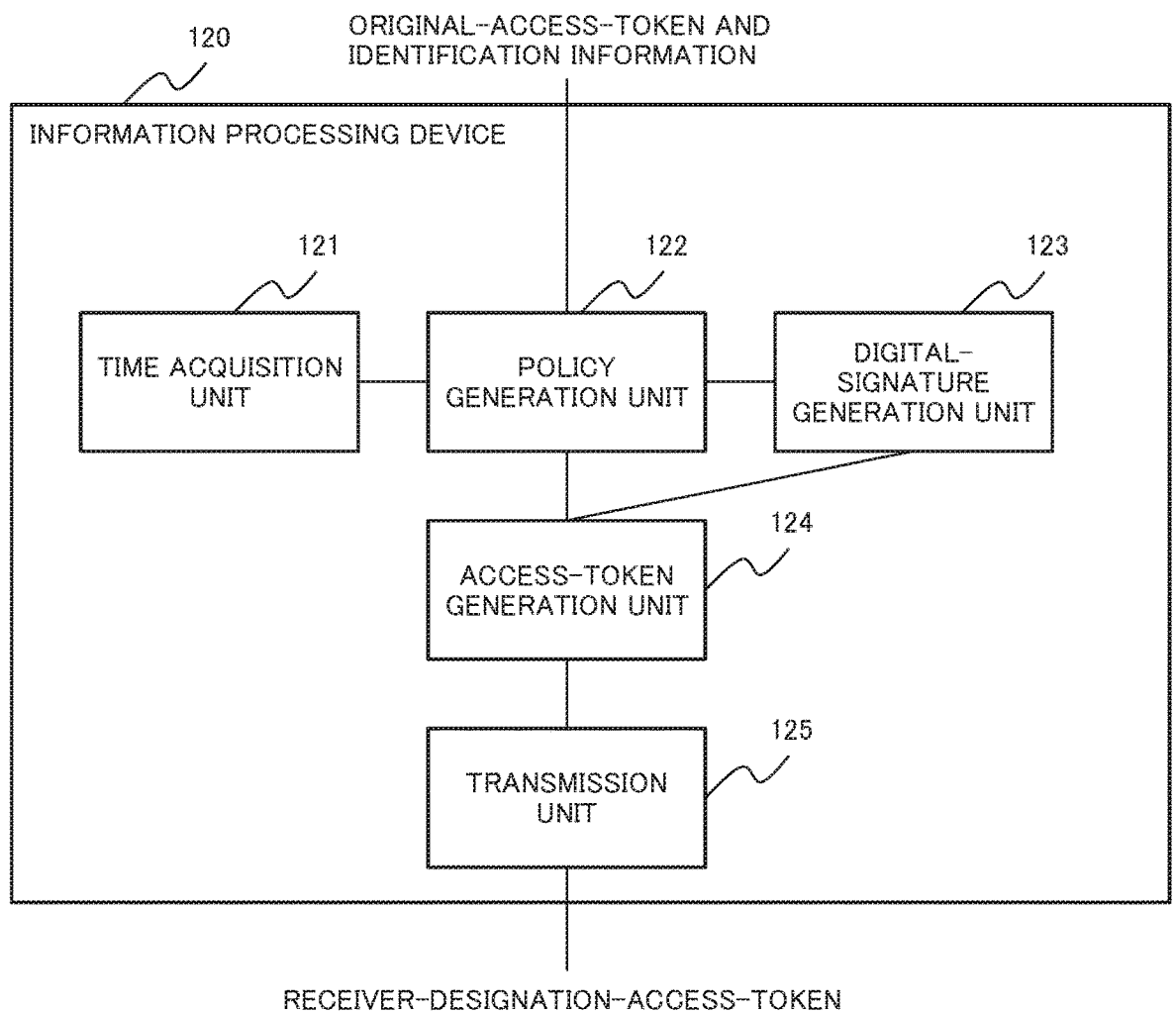
FIG. 1 is a block diagram illustrating one example of a configuration of an information processing device according to a first example embodiment in the present invention.

Next, an example embodiment of the present invention is described with reference to the drawings.

Note that each drawing serves to describe the example embodiment of the present invention. However, the present invention is not limited to description in each drawing. Moreover, the same number is given to similar components in each drawing, and repeated description thereof may be omitted. Additionally, in the drawings used for the following description, description may be omitted, and illustration may not be made, with regard to a component of a part which is not concerned with description of the present invention.

(Related Technique)

A technique related to the present invention is described as a technique for verifying distribution of a false access token.

As one example of a related technique, it is possible to assume a technique in which, in an access token system, a generation device of an access token stores pairs of every generated access token and information indicating a delegation destination (e.g., a receiver) of authority for the access token. In this case, a verification device can verify, based on the stored information, whether or not a person who has transmitted an access token and requires authority delegation is a receiver registered for the access token.

However, this technique requires a storage device (e.g., a database) for storing data including a pair of an access token and a receiver. The number of the pairs becomes the number of combinations of resources to be targets for access token generation and receivers (a product of the number of resources and the number of receivers). Thus, when a system becomes larger, resources and receivers to be management targets increase, and therefore, an amount of data to be management targets becomes a huge number.

In other words, this technique has an issue that data to be management targets increase, and cost of storage and management of the data increases. For example, when issuance of an access token is frequently conducted, data for management are frequently rewritten. In other words, this technique has an issue that cost for managing data for management increases.

One object of the present invention is to provide an information processing device and the like which solve the issues as described above.

First Example Embodiment

A first example embodiment is described below with reference to the drawings.

Description of Configuration

Figure 2:
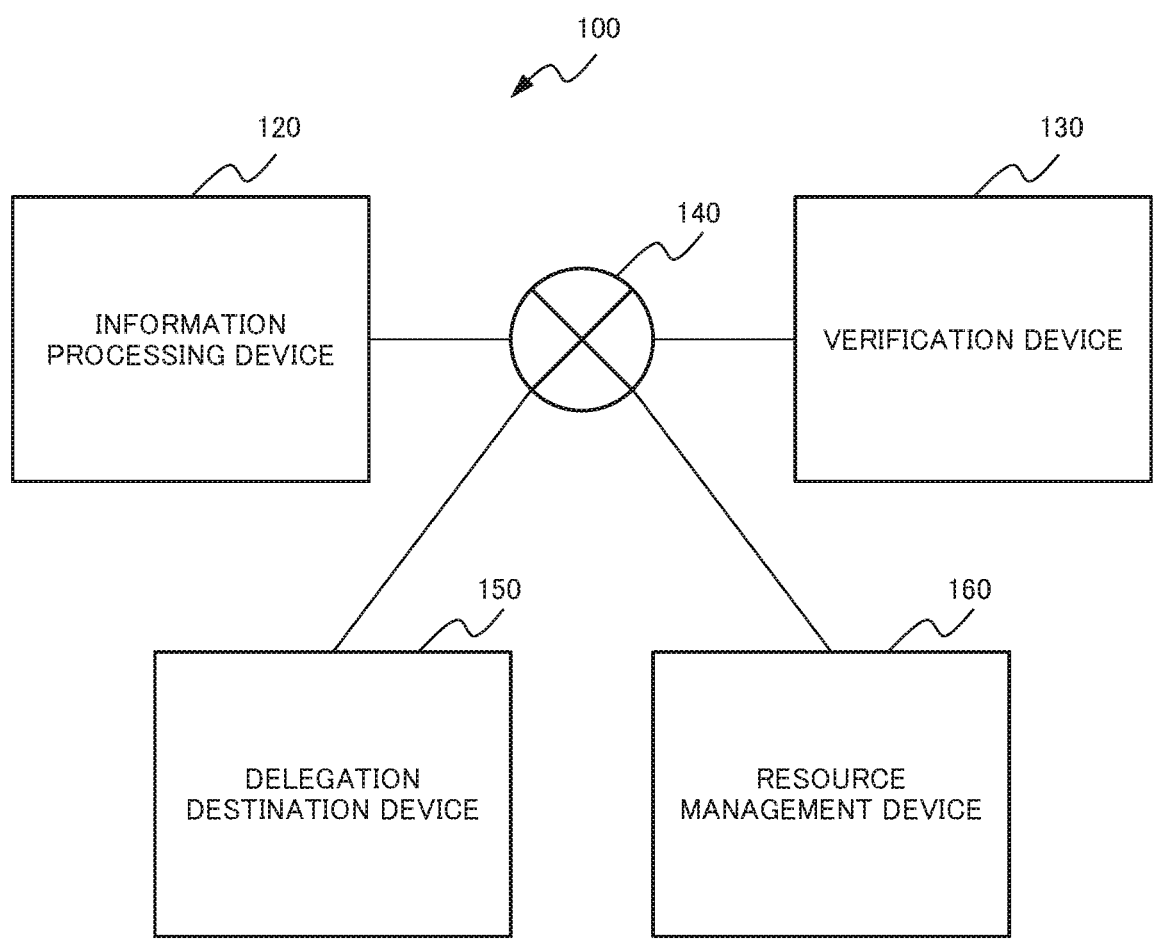
FIG. 2 is a block diagram illustrating one example of a configuration of an information processing system including the information processing device according to the first example embodiment.

FIG. 2 is a block diagram illustrating one example of a configuration of an information processing system 100 including an information processing device 120 and other devices according to the first example embodiment of the present invention.

The information processing system 100 includes the information processing device 120, a verification device 130, a network 140, a delegation destination device 150, and a resource management device 160.

The network 140 is a communication path which connects each of devices. The network 140 has any configuration. The network 140 may be, for example, the Internet, an intranet, or a telephone network. Thus, detailed description of the network 140 is omitted.

The information processing device 120 acquires, from a device operating by use of a resource managed by the resource management device 160, an access token (hereinafter, referred to as an "original-access-token" or a "first access token") for delegating the resource. Then, the information processing device 120 generates, according to the original-access-token, an access token (hereinafter, referred to as a "receiver-designation-access-token" or a "second access token") transmitted in order to delegate the resource, and transmits the access token to the delegation destination device 150. Details of the receiver-designation-access-token will be described later.

Note that the information processing device 120 may generate a receiver-designation-access-token for a resource used by the local device, and transmit the receiver-designation-access-token to the delegation destination device 150. In this case, acquisition of an original-access-token is not required in the information processing device 120.

When receiving the receiver-designation-access-token, the delegation destination device 150 uses the resource managed by the resource management device 160 by use of the received receiver-designation-access-token. When using the resource, the delegation destination device 150 transmits the receiver-designation-access-token to the resource management device 160. Note that the delegation destination device 150 receiving a receiver-designation-access-token, or a person managing or operating the delegation destination device 150 is a specific "receiver".

When receiving the receiver-designation-access-token, the resource management device 160 transmits the received receiver-designation-access-token to the verification device 130, and requests verification of the receiver-designation-access-token.

The verification device 130 verifies whether or not the received receiver-designation-access-token is proper.

Then, when the receiver-designation-access-token is proper as a result of the verification in the verification device 130, the resource management device 160 permits the delegation destination device 150 to access the resource.

The delegation destination device 150, the resource management device 160, and the network 140 respectively include configurations similar to those of devices and a communication path used in a general access token system, and operate in similar ways. Thus, detailed descriptions of these configurations are omitted.

The information processing device 120 and the verification device 130 according to the first example embodiment are described below in further detail.

Note that, in FIG. 2, the information processing device 120, the verification device 130, the delegation destination device 150, and the resource management device 160 are separate devices. However, in the first example embodiment, a plurality of devices may be physically mounted on one device. For example, the information processing device 120 and the verification device 130 may be physically mounted on one device (e.g., a computer). Alternatively, the resource management device 160 and the verification device 130 may be physically mounted on one device (e.g., a computer).

As described below in detail, the information processing device 120 generates a receiver-designation-access-token as information for delegating authority of a resource. Further, the information processing device 120 generates a receiver-designation-access-token in order to verify false distribution. However, this does not limit information generated by the information processing device 120 according to the first example embodiment to a receiver-designation-access-token. The information processing device 120 may not exclusively generate an access token, but may generate another piece of authentication information enabling verification of false distribution.

Next, a configuration of the information processing device 120 is described with reference to the drawings.

FIG. 1 is a block diagram illustrating one example of the configuration of the information processing device 120 according to the first example embodiment.

The information processing device 120 includes a time acquisition unit 121, a policy generation unit 122, a digital-signature generation unit 123, an access-token generation unit 124, and a transmission unit 125.

The time acquisition unit 121 acquires a current time. The time acquisition unit 121 is, for example, a clock or a counter. The time acquisition unit 121 may acquire time from a non-illustrated external timer device.

Note that when the time acquisition unit 121 and a time acquisition unit 131 described later are distinguished from each other, the time acquisition unit 121 is referred to as a "first time acquisition means". Moreover, the time acquisition unit 131 is referred to as a "second time acquisition means". Further, a time acquired by the time acquisition unit 121 is referred to as a "first time". Moreover, a time acquired by the time acquisition unit 131 is referred to as a "second time".

The policy generation unit 122 acquires an original-access-token for a resource being a target for delegation of authority, and information (hereinafter, briefly referred to as "identification information") for identifying a receiver receiving authority of the resource.

An acquisition source of an original-access-token and identification information for the policy generation unit 122 is any acquisition source. For example, the policy generation unit 122 may acquire an original-access-token and identification information stored in a non-illustrated storage device. Alternatively, the policy generation unit 122 may acquire an original-access-token and identification information from a non-illustrated device to which authority of a resource needs to be delegated. Alternatively, the policy generation unit 122 may generate an original-access-token and identification information relating to a resource used by the information processing device 120.

Furthermore, an original-access-token and identification information may have any data format and contents.

For example, an original-access-token may be a "uniform resource locator (URL)" described in NPL 3, or may be a "cookie" described in NPL 4.

Moreover, for example, identification information is an identifier (receiver identifier) for uniquely identifying a receiver. More specifically, a receiver identifier is, for example, a numerical value (e.g., an employee number or a membership number) allocated by an organization to which a receiver belongs.

Furthermore, the policy generation unit 122 acquires a current time (first time) from the time acquisition unit 121. Then, the policy generation unit 122 generates a term of validity, based on the time (first time). A method of generating a term of validity in the policy generation unit 122 is any method. For example, the policy generation unit 122 may generate a term of validity by adding a previously stored term to a current time.

Then, the policy generation unit 122 generates a policy including an original-access-token, a term of validity, and identification information.

Herein, a format of a policy is any format. For example, a policy may be data in which a file in a JavaScript object notation (JASON) format described in NPL 2 is coded (encoded) by use of Base 64. Note that Base 64 indicates coding data by use of 64 kinds of symbols (normally, alphabetic capital letters (26 letters) and lower-case letters (26 letters), numbers (10 letters), "+", and "/").

In other words, a policy according to the first example embodiment includes identification information, in addition to an original-access-token relating to delegation of authority of a resource being an access target, and a term of validity, as described above.

The digital-signature generation unit 123 generates a digital signature, based on a policy. The digital signature is information for verifying whether sent data are not tampered.

Thus, the digital-signature generation unit 123 first calculates a hash value (first hash value) of the policy by use of a predetermined hash function. Note that the information processing device 120 and the verification device 130 share the hash function.

A hash function according to the first example embodiment is required to be a cryptographic hash function. A cryptographic hash function includes the following characteristics in addition to characters desired in a general hash function.

(1) Being unable to form a message having the same hash value, and being very similar but different in actuality.

(2) Being unable (in effect) to acquire, from a hash value, a message whose hash value becomes the hash value (pre-image resistance, and weak collision resistance).

(3) Being unable (in effect) to acquire a pair of two different messages having the same hash value (strong collision resistance)

For example, a cryptographic hash function (h(x)) is a function which is not only difficult to infer x from a hash value (h(x)), but also difficult to acquire different two (x1 and x2) having the same hash values (h(x1)=h(x2)).

Then, the digital-signature generation unit 123 generates a digital signature from a hash value.

A method of a digital signature according to the first example embodiment is any method. For example, a digital signature is a Rivest Shamir and Adleman (RSA) signature using a public key, or a hash-based message authentication code (HMAC) described in NPL 1. The digital-signature generation unit 123 previously stores information (e.g., a signing key for generating a digital signature) required for the method described above.

The access-token generation unit 124 generates a receiver-designation-access-token including a policy and a digital signature.

The transmission unit 125 transmits the receiver-designation-access-token to the delegation destination device 150 (i.e., a receiver).

When using a resource, the delegation destination device 150 transmits the receiver-designation-access-token to the resource management device 160.

The resource management device 160 transmits the received receiver-designation-access-token to the verification device 130, and requests verification of propriety of the receiver-designation-access-token.

The verification device 130 verifies whether or not the received receiver-designation-access-token is proper.

Next, a configuration of the verification device 130 is described with reference to the drawings.

Figure 3:
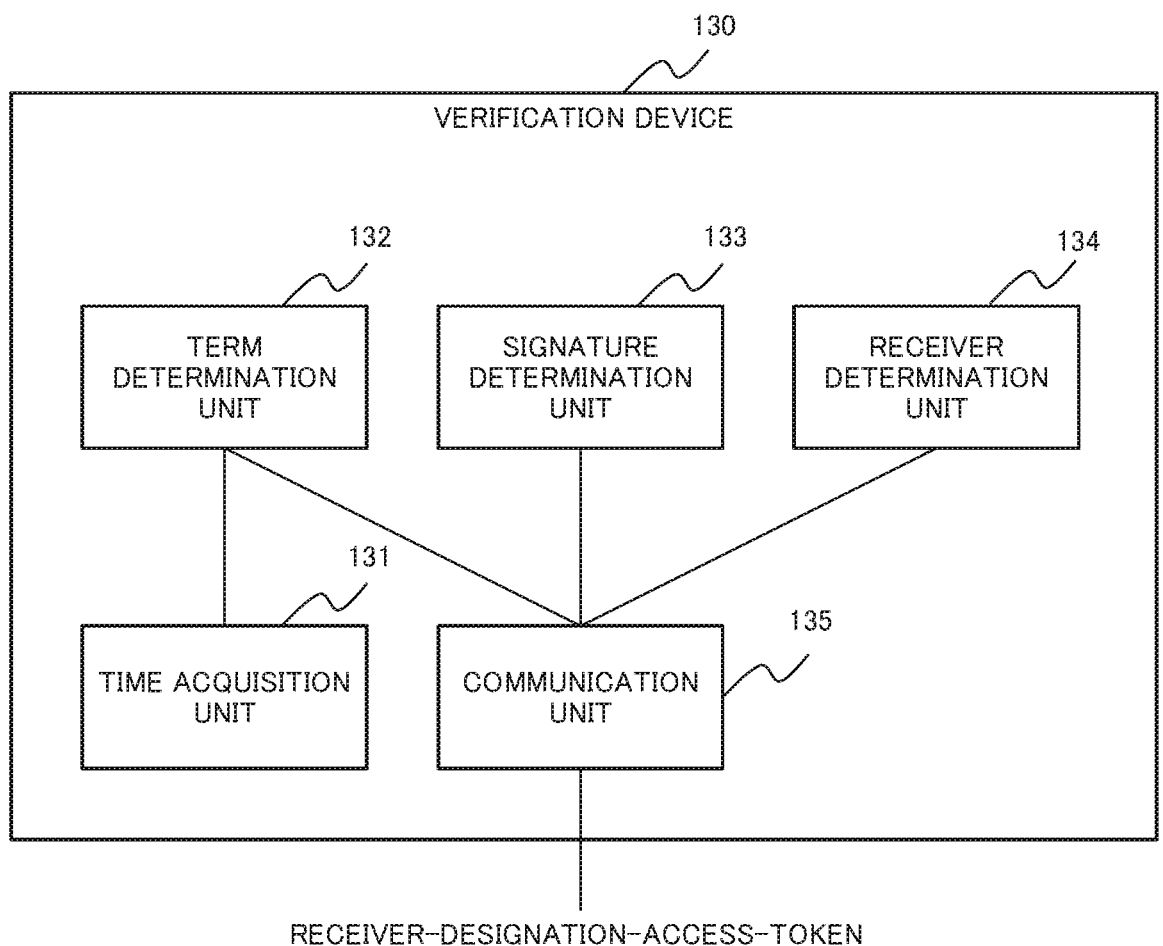
FIG. 3 is a block diagram illustrating one example of a configuration of a verification device according to the first example embodiment.

FIG. 3 is a block diagram illustrating one example of the configuration of the verification device 130 according to the first example embodiment.

The verification device 130 includes a time acquisition unit 131, a term determination unit 132, a signature determination unit 133, a receiver determination unit 134, and a communication unit 135.

The communication unit 135 receives a receiver-designation-access-token (second access token).

The time acquisition unit 131 acquires a current time (second time). The time acquisition unit 131 is, for example, a clock or a counter. The time acquisition unit 131 may acquire a time from a non-illustrated external timer device.

The term determination unit 132 determines, based on a term of validity included in the receiver-designation-access-token and the second time, whether or not the receiver-designation-access-token is within the term of validity.

When the receiver-designation-access-token is not within the term of validity, the verification device 130 determines that the receiver-designation-access-token is not proper (false). In this case, the communication unit 135 transmits, to the resource management device 160, a verification result indicating that the receiver-designation-access-token is false. As a result, the resource management device 160 returns, to the delegation destination device 150, for example, a message indicating "access rejection".

When the receiver-designation-access-token is within the term of validity, the signature determination unit 133 determines whether or not a digital signature included in the receiver-designation-access-token is valid.

Specifically, the signature determination unit 133 operates as follows. The signature determination unit 133 previously stores a key (verification key) for verification for decrypting a digital signature. Further, the signature determination unit 133 stores a hash function used for determination. This hash function is a function shared with the information processing device 120. Then, the signature determination unit 133 determines whether or not a value applied the hash function to a policy included in the receiver-designation-access-token coincides with the decrypted digital signature.

Determination in the signature determination unit 133 is described by use of a variable and a function as follows.

It is assumed that, as variables used for description, a signing key is "ks", a verification key is "kv", and a plaintext (policy) is "m". Further, it is assumed that a function of an algorithm for signature generation in the digital-signature generation unit 123 is "Sign (key, text)". For example, assuming that a digital signature is "σ", the digital signature σ is "σ=Sign(ks, m)". Note that the function Sign includes a function of a hash function.

Moreover, it is assumed that a function of an algorithm for verification in the signature determination unit 133 is "Verify (digital signature, text, decryption key)". The function Verify is a function which decrypts, with a decryption key, a digital signature serving as an argument, and outputs a result of comparison between a decryption result and a plaintext (policy) of the argument. Herein, an output of the function Verify in a case of coincidence is "1", and an output of the function Verify in a case of non-coincidence is "0". Note that the function Verify includes a function of a hash function.

In this case, the signature determination unit 133 may determine, as determination of a digital signature, whether or not "Verify(σ, m, kv)=1" is satisfied.

When the digital signature is not valid, the verification device 130 determines that the receiver-designation-access-token is not proper (false). In this case, the communication unit 135 transmits, to the resource management device 160, a verification result indicating that the receiver-designation-access-token is false. As a result, the resource management device 160 returns, to the delegation destination device 150, for example, a message indicating "access rejection".

When the digital signature is valid, the receiver determination unit 134 determines, based on identification information included in the receiver-designation-access-token, whether or not the receiver-designation-access-token is proper distribution.

When the receiver-designation-access-token is not proper distribution (when the receiver-designation-access-token is false distribution), the communication unit 135 transmits, to the resource management device 160, a verification result indicating that the receiver-designation-access-token is false. As a result, the resource management device 160 returns, to the delegation destination device 150, for example, a message indicating "access rejection".

When the receiver-designation-access-token is proper distribution, the communication unit 135 transmits, to the resource management device 160, a verification result indicating that the receiver-designation-access-token is proper. In this case, the resource management device 160 permits the delegation destination device 150 to access.

Determination in the receiver determination unit 134 is made in any way. For example, determination in the receiver determination unit 134 may be made based on a configuration and the like of the information processing system 100.

An example of determination in the receiver determination unit 134 is described below.

The verification device 130 stores, as history, a result of determination for a receiver-designation-access-token. For example, the history includes a determination result (identification information, and a result of determination based on the identification information) by a receiver determination unit 234. Note that a result of determination included in the history is not limited to a case of determining to be false, but may include a case of determining to be proper. Moreover, the history may include a determination result (determination of a term of validity) by the term determination unit 132, and/or a determination result (determination of a digital signature) by the signature determination unit 133.

The receiver determination unit 134 determines identification information by use of the history.

For example, a fraudulent person may transmit a large quantity of access tokens in order to acquire authority of access. Thus, when receiving more receiver-designation-access-tokens including the same identification information than a predetermined threshold within a predetermined period, the receiver determination unit 134 determines that the receiver-designation-access-tokens including the identification information are false.

However, determination by the receiver determination unit 134 is not limited to the determination described above.

For example, a fraudulent person may be present at a location (e.g., a foreign country) physically away from a regular receiver. Thus, when locations of devices being transmission sources of a receiver-designation-access-token are a plurality of devices physically situated at locations a predetermined distance or more away, the receiver determination unit 134 may determine that the receiver-designation-access-token is false. Determination of a location in the verification device 130 is made in any way. For example, the verification device 130 may determine a location for a transmission source, by use of an Internet protocol (IP) address of the transmission source in a packet used for transmission of the receiver-designation-access-token.

Furthermore, when the receiver determination unit 134 determines, based on identification information, that the receiver-designation-access-token is false, the verification device 130 may execute notification of a result of determination. For example, the verification device 130 may report, to the information processing device 120 which has generated the receiver-designation-access-token, that a false receiver-designation-access-token is received.

Description of Operation

Next, operations of the information processing device 120 and the like according to the first example embodiment are described with reference to the drawings.

Figure 4:
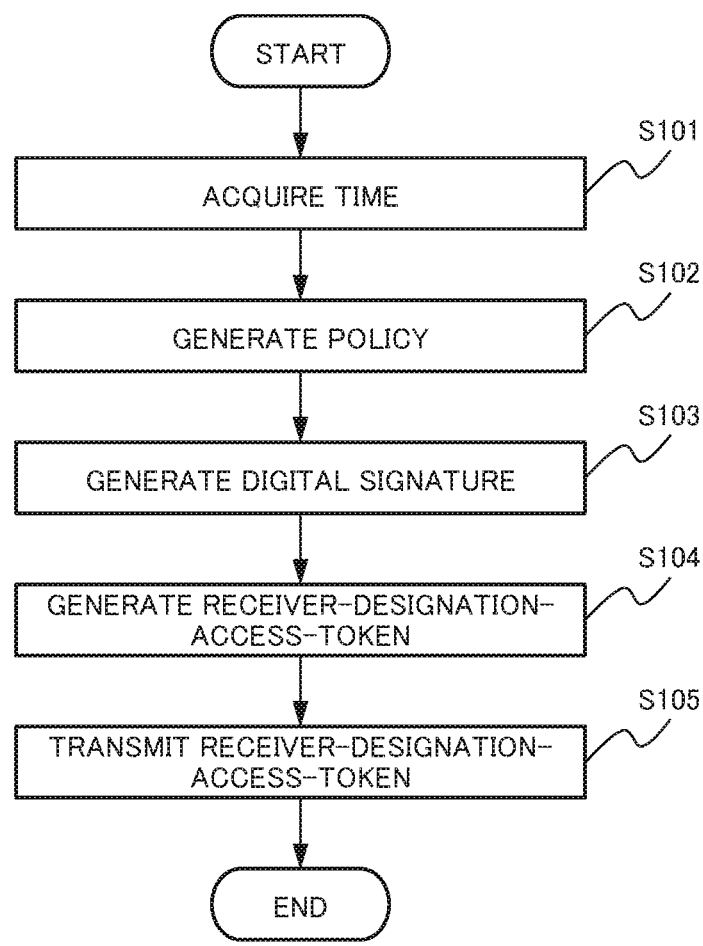
FIG. 4 is a flowchart illustrating one example of an operation of the information processing device according to the first example embodiment.

FIG. 4 is a flowchart illustrating one example of the operation of the information processing device 120 according to the first example embodiment.

The time acquisition unit 121 acquires a current time (first time) (step S101).

The policy generation unit 122 calculates (generates) a term of validity, based on the current time. Then, the policy generation unit 122 generates a policy including an original-access-token, the term of validity, and identification information (step S102). Note that the policy generation unit 122 may receive or generate the original-access-token and the identification information.

The digital-signature generation unit 123 calculates a hash value by applying a hash function to the policy, and generates a digital signature, based on the hash value (step S103).

The access-token generation unit 124 generates a receiver-designation-access-token including the policy and the digital signature (step S104).

The transmission unit 125 transmits the receiver-designation-access-token (step S105).

Figure 5:
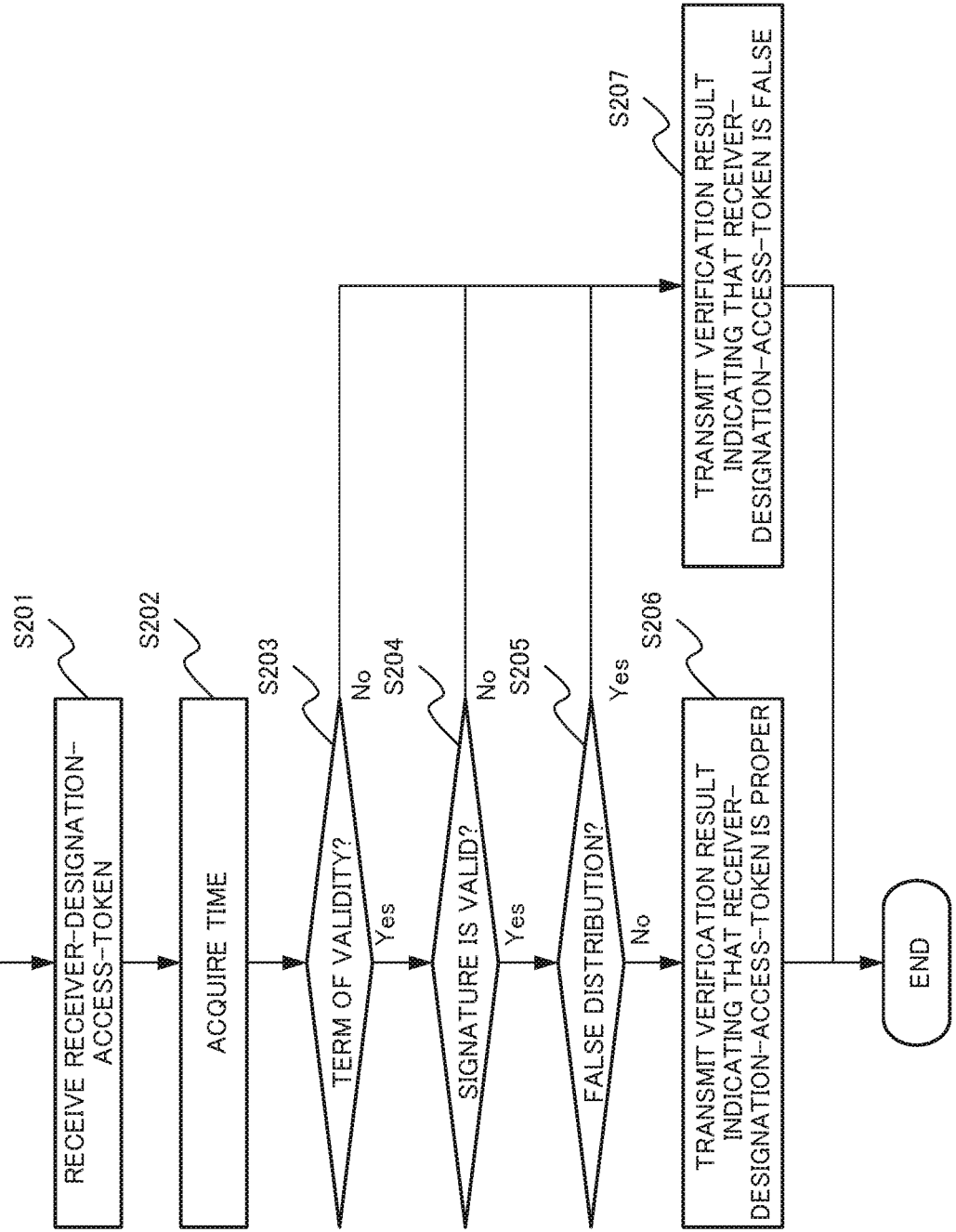
FIG. 5 is a flowchart illustrating one example of an operation of the verification device according to the first example embodiment.

FIG. 5 is a flowchart illustrating one example of the operation of the verification device 130 according to the first example embodiment.

The communication unit 135 receives a receiver-designation-access-token (step S201).

The time acquisition unit 131 acquires a current time (second time) (step S202).

The term determination unit 132 determines whether or not the receiver-designation-access-token is within the term of validity (step S203).

When the receiver-designation-access-token is not within the term of validity (No in step S203), the communication unit 135 transmits a verification result indicating that the receiver-designation-access-token is false (step S207).

When the receiver-designation-access-token is within the term of validity (Yes in step S203), the signature determination unit 133 determines whether or not a digital signature included in the receiver-designation-access-token is valid (step S204).

When the digital signature is not valid (No in step S204), the communication unit 135 transmits a verification result indicating that the receiver-designation-access-token is false (step S207).

When the digital signature is valid (Yes in step S204), the receiver determination unit 134 determines, based on identification information included in the receiver-designation-access-token, whether or not the receiver-designation-access-token is false distribution (step S205).

When the receiver-designation-access-token is false distribution (Yes in step S205), the communication unit 135 transmits a verification result indicating that the receiver-designation-access-token is false (step S207).

When the receiver-designation-access-token is not false distribution (when the receiver-designation-access-token is proper) (No in step S205), the communication unit 135 transmits a verification result indicating that the receiver-designation-access-token is proper (step S206).

Description of Advantageous Effect

Next, an advantageous effect of the information processing device 120 according to the first example embodiment is described.

The information processing device 120 can provide an advantageous effect of generating an access token enabling verification of whether or not distribution is distribution from a proper receiver.

A reason for this is as follows.

The time acquisition unit 121 (first time acquisition means) acquires a current time (first time). The policy generation unit 122 generates, based on the current time, a term of validity of an original-access-token (first access token), and generates a policy including the original-access-token, the term of validity, and identification information of a receiver of the original-access-token. The digital-signature generation unit 123 generates a digital signature, based on the policy. The access-token generation unit 124 generates a receiver-designation-access-token (second access token) including the policy and the digital signature. The transmission unit 125 transmits the receiver-designation-access-token.

In this way, the information processing device 120 generates and then transmits a receiver-designation-access-token including information (identification information) for identifying a receiver. Thus, a device (e.g., the verification device 130) receiving the receiver-designation-access-token can verify, by use of information (identification information) for identifying a receiver, whether or not distribution is distribution from a proper receiver of the access token.

In other words, the verification device 130 provides an advantageous effect of being able to verify, based on a receiver-designation-access-token, whether or not distribution is distribution from a proper receiver.

A reason for this is as follows.

The communication unit 135 receives a receiver-designation-access-token (second access token). The time acquisition unit 131 (second time acquisition means) acquires a current time (second time). The term determination unit 132 determines, based on a term of validity included in the receiver-designation-access-token and the current time, whether or not the receiver-designation-access-token is valid. The signature determination unit 133 determines, based on a digital signature included in the receiver-designation-access-token, whether or not the receiver-designation-access-token is valid. The receiver determination unit 134 determines, based on identification information included in the receiver-designation-access-token, whether or not the receiver-designation-access-token is falsely distributed.

In this way, the verification device 130 can determine whether or not a receiver-designation-access-token is falsely distributed, by use of identification information included in the receiver-designation-access-token, in addition to determination of a term of validity and determination of a digital signature.

In a case where a receiver-designation-access-token generated by the information processing device 120 is used, the verification device 130 can verify false use of a receiver-designation-access-token, even when a fraudulent person attempts to acquire authority of access to a resource by use of the receiver-designation-access-token.

Furthermore, the first example embodiment provides an advantageous effect of reducing an amount of required information.

A reason for this is that information used by the verification device 130 for determination of false distribution is identification information (e.g., receiver identifier) of a receiver. The number of pieces of identification information of receivers becomes a number smaller than the number of combinations of receivers and resources. In other words, the information processing system 100 can verify false distribution by use of information less than that in the related technique.

Second Example Embodiment

The first example embodiment can verify a proper receiver of a falsely used access token. However, the first example embodiment uses a receiver identifier as identification information. The receiver identifier is information uniquely identifying a receiver. In other words, a person acquiring a receiver-designation-access-token can acquire information uniquely identifying a receiver. From the viewpoint of protection of privacy, it is preferable that an identifier of a receiver is not known. Thus, a second example embodiment protects an identifier of a receiver.

Description of Configuration

A configuration of an information processing system 200 including an information processing device 220 according to the second example embodiment is described with reference to the drawings.

Figure 6:
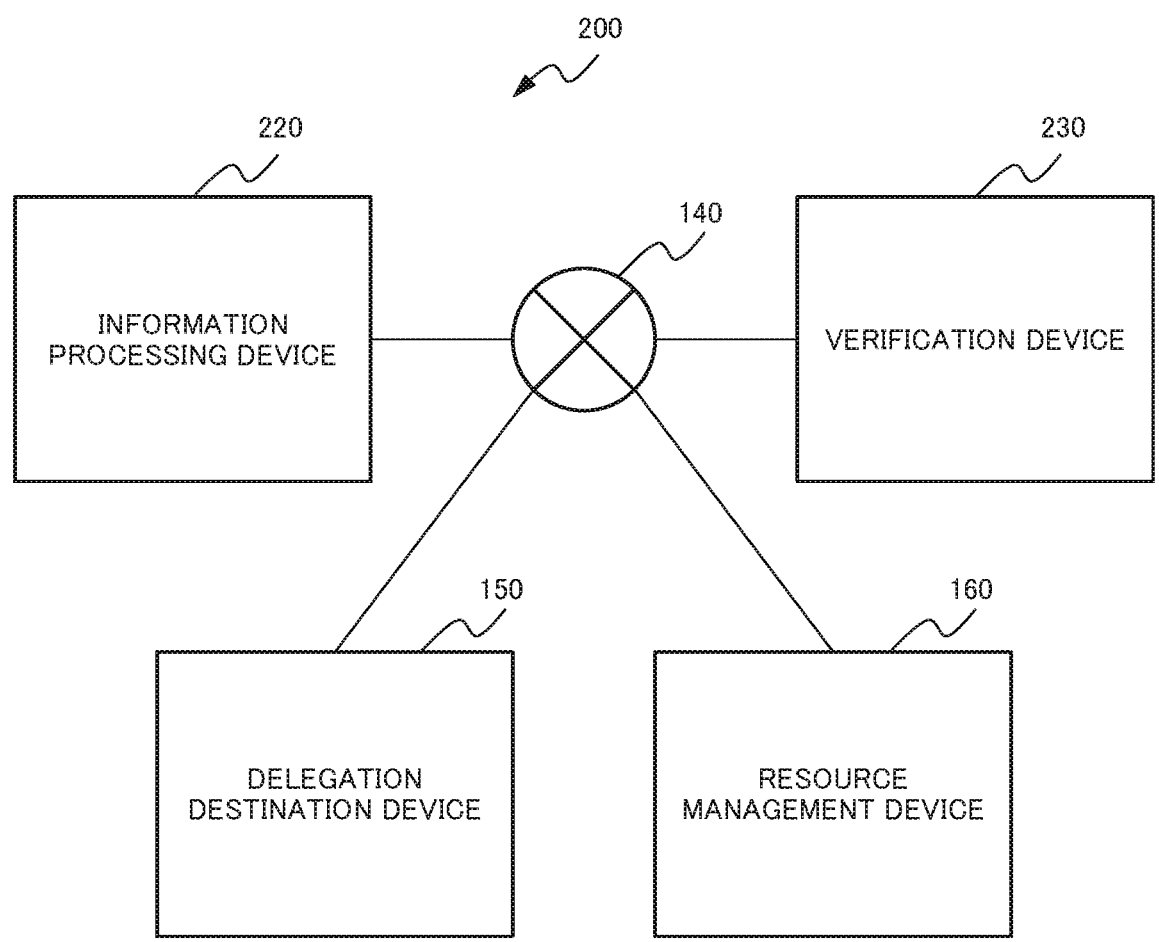
FIG. 6 is a block diagram illustrating one example of a configuration of an information processing system including an information processing device according to a second example embodiment.

FIG. 6 is a block diagram illustrating one example of the configuration of the information processing system 200 including the information processing device 220 according to the second example embodiment.

The information processing system 200 includes the information processing device 220, a verification device 230, a network 140, a delegation destination device 150, and a resource management device 160. The network 140, the delegation destination device 150, and the resource management device 160 are similar to those in the first example embodiment, and therefore, detailed description thereof is omitted.

Next, configurations of the information processing device 220 and the verification device 230 are described with reference to the drawings.

Figure 7:
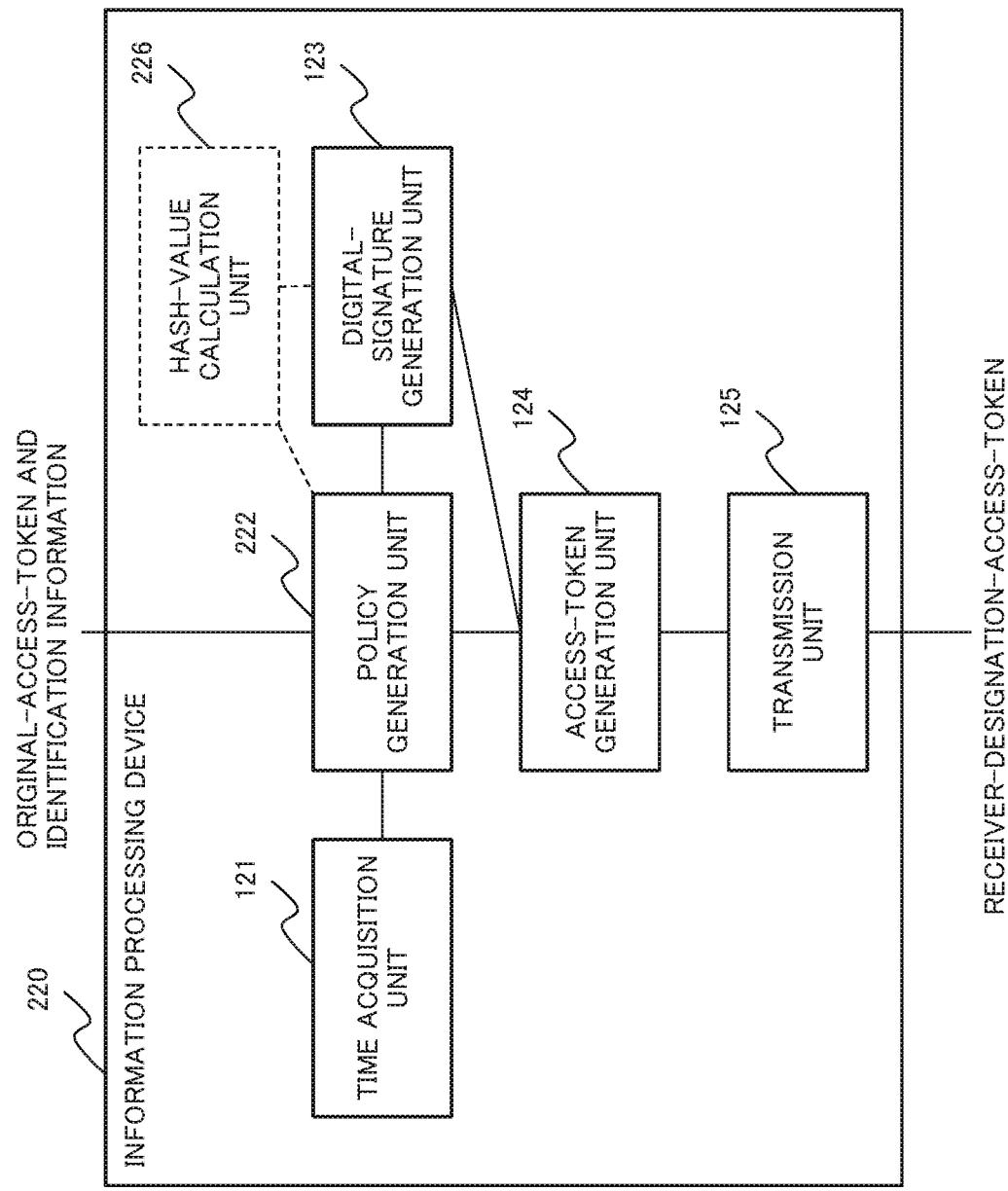
FIG. 7 is a block diagram illustrating one example of a configuration of the information processing device according to the second example embodiment.

FIG. 7 is a block diagram illustrating one example of a configuration of the information processing device 220 according to the second example embodiment.

The information processing device 220 is different from the information processing device 120 according to the first example embodiment in including a policy generation unit 222 instead of the policy generation unit 122. Description of a component similar to that according to the first example embodiment is suitably omitted, and a configuration specific to the second example embodiment is described.

The policy generation unit 222 calculates a hash value (second hash value) by applying a hash function to a receiver identifier. Then, the policy generation unit 222 generates a policy by use of the hash value instead of the receiver identifier. Other operations of the policy generation unit 222 are similar to the operations of the policy generation unit 122.

A hash function for calculating a hash value is a one-way function. A hash value is a value from which it is difficult to estimate original data. In other words, identification information included in a receiver-designation-access-token generated by the information processing device 220 is information from which it is difficult to know an identifier of a receiver.

However, the same hash value is calculated from the same identification information. Thus, a device (e.g., the verification device 230) receiving a receiver-designation-access-token can determine, by use of the hash value, whether or not the receiver-designation-access-token is an access token including the same identification information.

Note that a hash function has a possibility that the same hash value is calculated from different identification information. However, a possibility of having the same hash value can be decreased to a degree that does not matter in practice, by appropriately selecting a hash function.

The policy generation unit 222 may use, as a hash function, the same hash function as a hash function used by the digital-signature generation unit 123. Alternatively, the policy generation unit 222 may store a hash function different from a hash function used by the digital-signature generation unit 123, and calculate a hash value by use of the hash function. Further, the information processing device 220 may include, as a component different from the policy generation unit 222 (and/or the digital-signature generation unit 123), a hash-value calculation unit 226 which calculates a hash value by use of a hash function. Accordingly, FIG. 7 illustrates the hash-value calculation unit 226 by use of a broken line.

In this way, the information processing device 220 uses, as identification information, a hash value with which a receiver cannot be uniquely identified.

Figure 8:
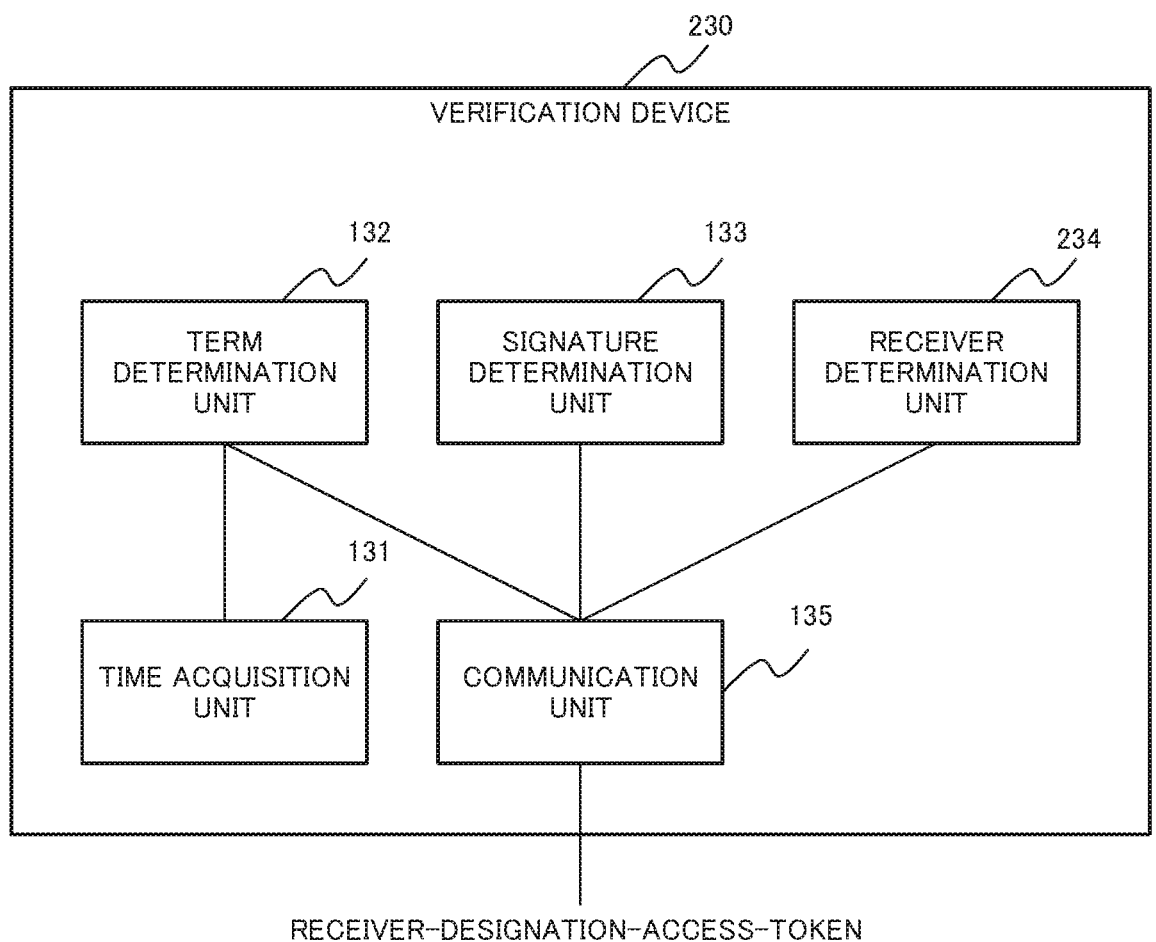
FIG. 8 is a block diagram illustrating one example of a configuration of a verification device according to the second example embodiment.

FIG. 8 is a block diagram illustrating one example of a configuration of the verification device 230 according to the second example embodiment.

The verification device 230 is different from the verification device 130 according to the first example embodiment in including a receiver determination unit 234 instead of the receiver determination unit 134. Description of a component similar to that according to the first example embodiment is suitably omitted, and a configuration specific to the second example embodiment is described.

The receiver determination unit 234 uses, as identification information, not a receiver identifier, but a hash value included in a receiver-designation-access-token. Other operations of the receiver determination unit 234 are similar to those in the first example embodiment.

In this way, the verification device 230 uses, as identification information, not an identifier of a receiver, but a hash value. A hash value is difficult to estimate original data therefrom. In other words, it is difficult for the verification device 230 to know an identifier of a receiver.

However, the same hash value is calculated from the same identification information. Thus, the verification device 230 can determine whether or not a receiver-designation-access-token is a receiver-designation-access-token including the same identification information.

In this way, the information processing device 220 according to the second example embodiment generates a receiver-designation-access-token with which false distribution can be determined in such a way that an identifier of a receiver is not known.

Description of Advantageous Effect

The information processing device 220 according to the second example embodiment provides an advantageous effect of protecting identification information of a receiver, in addition to the advantageous effect according to the first example embodiment.

A reason for this is that the policy generation unit 222 includes a hash value of an identifier of a receiver in a receiver-designation-access-token.

Third Example Embodiment

The second example embodiment protects a receiver identifier. However, the same hash value is calculated from the same identification information. Thus, the verification device 230 according to the second example embodiment can determine whether or not a receiver-designation-access-token is a receiver-designation-access-token including the same identification information. In this case, there is a possibility that a particular device can infer a receiver, based on a resource associated with an access token, and a frequency of attempts to access the resource. From the viewpoint of protection of privacy, it is preferable that a receiver is not inferred.

Thus, a third example embodiment generates a receiver-designation-access-token which can prevent inference of a receiver.

Description of Configuration

A configuration of an information processing system 300 including an information processing device 320 according to the third example embodiment is described with reference to the drawings.

Note that the following description is given by use of a verification device 330 as a device which acquires identification information. However, in the third example embodiment, a device which acquires identification information is not limited to the verification device 330. For example, a non-illustrated resource server which manages a resource, or an application server providing a predetermined service may acquire identification information included in a receiver-designation-access-token.

Figure 9:
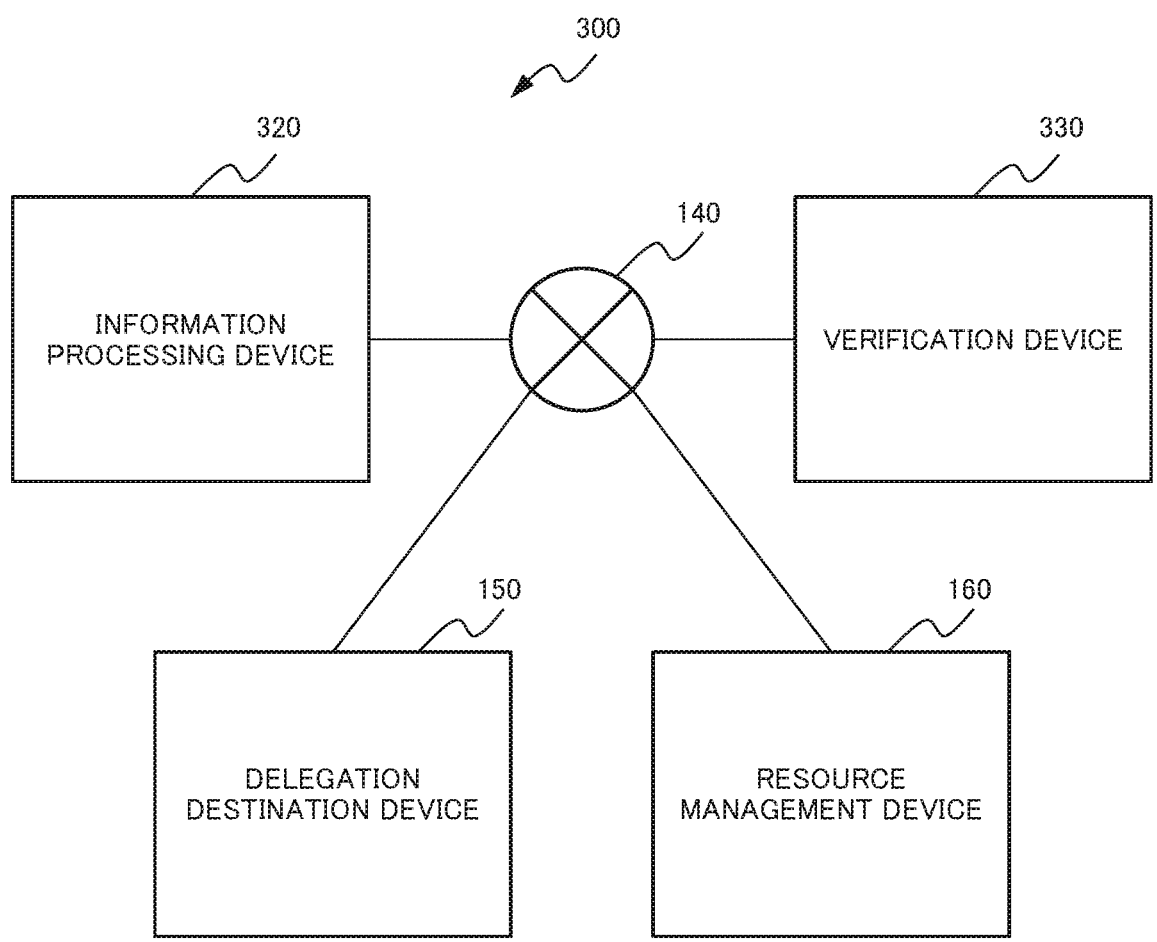
FIG. 9 is a block diagram illustrating one example of a configuration of an information processing system including an information processing device according to a third example embodiment.

FIG. 9 is a block diagram illustrating one example of a configuration of the information processing system 300 including the information processing device 320 according to the third example embodiment.

The information processing system 300 includes the information processing device 320, the verification device 330, a network 140, a delegation destination device 150, and a resource management device 160. The network 140, the delegation destination device 150, and the resource management device 160 are similar to those in the first example embodiment, and therefore, detailed description thereof is omitted.

Next, configurations of the information processing device 320 and the verification device 330 are described with reference to the drawings.

Figure 10:
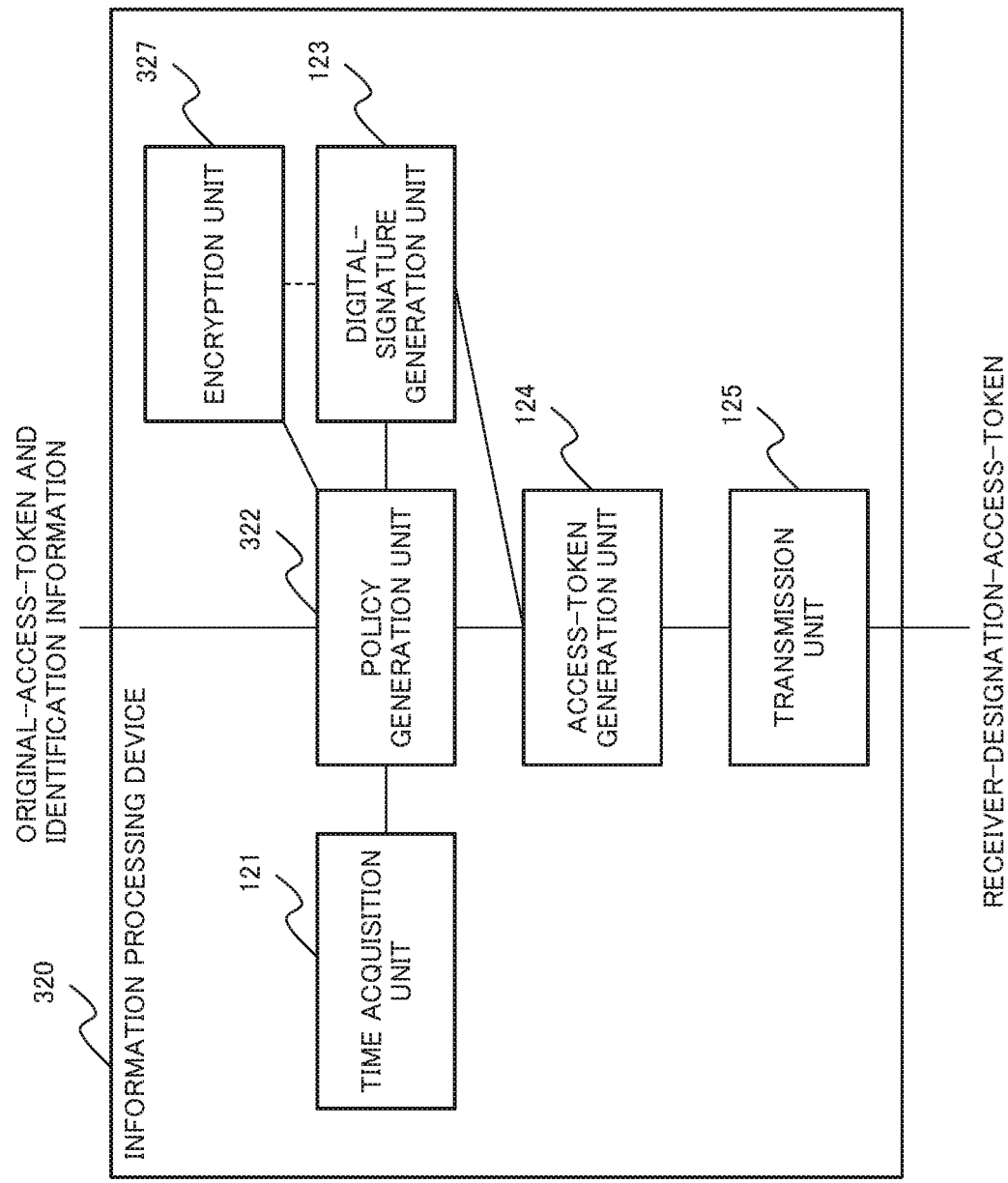
FIG. 10 is a block diagram illustrating one example of a configuration of the information processing device according to the third example embodiment.

FIG. 10 is a block diagram illustrating one example of a configuration of the information processing device 320 according to the third example embodiment.

The information processing device 320 is different from the information processing device 120 according to the first example embodiment in including a policy generation unit 322 instead of the policy generation unit 122, and further including an encryption unit 327. Description of a component similar to that according to the first example embodiment is suitably omitted, and a configuration specific to the second example embodiment is described.

The encryption unit 327 encrypts identification information. Herein, identification information is not limited to a receiver identifier according to the first example embodiment, and may be a hash value according to the second example embodiment. In other words, the third example embodiment is applicable to the second example embodiment.

A method of encryption used by the encryption unit 327 is any method. For example, the encryption unit 327 may use secret key encryption as in an advanced encryption standard (AES) described in NPL 5. Alternatively, the encryption unit 327 may use the same cipher as encryption used by the digital-signature generation unit 123. When the policy generation unit 322 and the digital-signature generation unit 123 use the same cipher, the information processing device 320 may include the encryption unit 327 as an external component of the digital-signature generation unit 123. In order to include this case, FIG. 10 connects the digital-signature generation unit 123 and the encryption unit 327 by use of a dotted line.

The policy generation unit 322 encrypts identification information by use of the encryption unit 327. Then, the policy generation unit 322 generates a policy including an original-access-token, a term of validity, and encrypted identification information.

In this way, the information processing device 320 encrypts identification information in such a way that a device having no decryption key is not able to know contents of the identification information, and generates a receiver-designation-access-token by use of the encrypted identification information. In other words, the information processing device 320 protects identification information.

Figure 11:
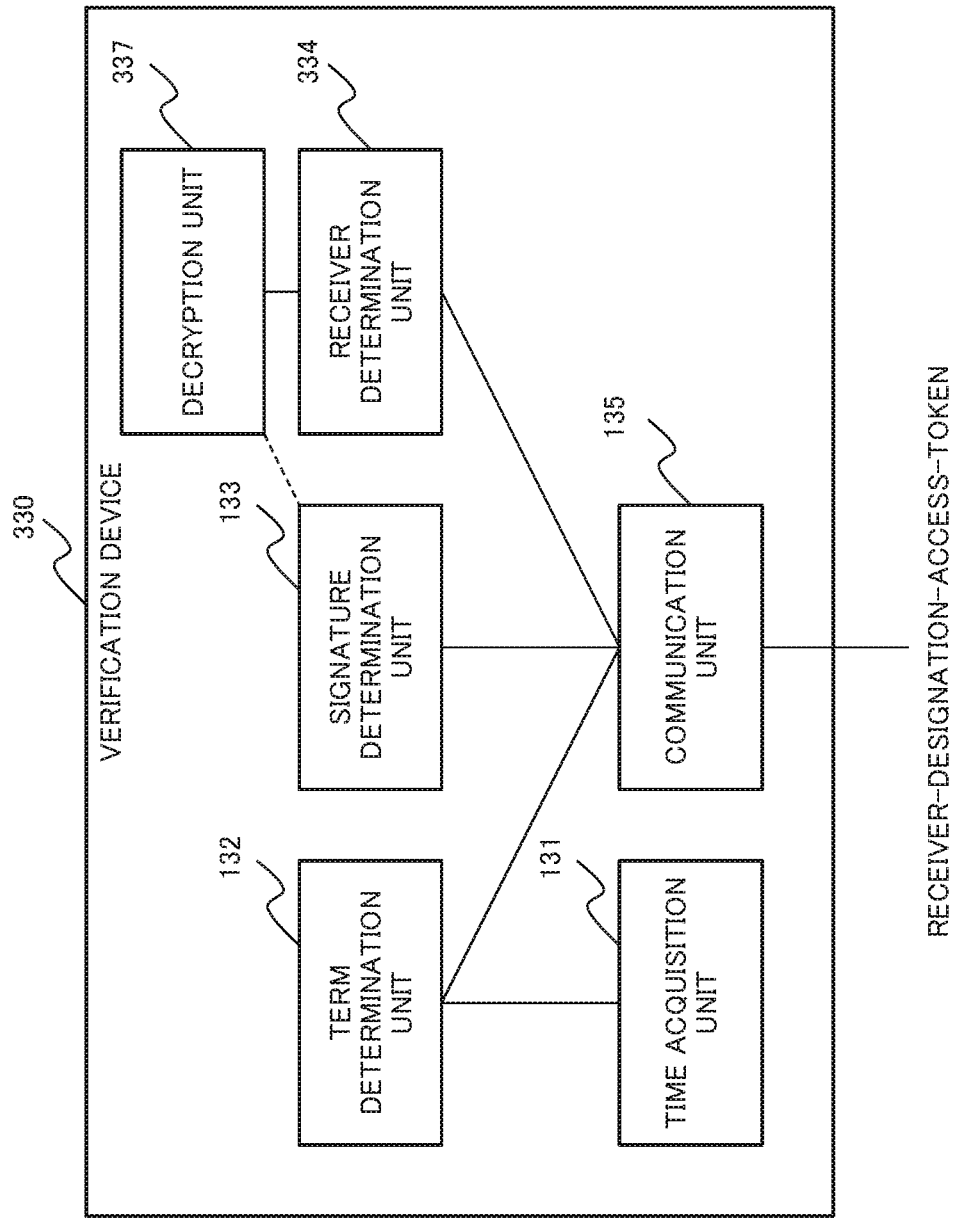
FIG. 11 is a block diagram illustrating one example of a configuration of a verification device according to the third example embodiment.

FIG. 11 is a block diagram illustrating one example of a configuration of the verification device 330 according to the third example embodiment.

The verification device 330 is different from the verification device 130 according to the first example embodiment in including a receiver determination unit 334 instead of the receiver determination unit 134, and further including a decryption unit 337. Description of a component similar to that according to the first example embodiment is suitably omitted, and a configuration specific to the second example embodiment is described.

The receiver determination unit 334 decrypts, by use of the decryption unit 337, encrypted identification information included in a receiver-designation-access-token. The following operation of the receiver determination unit 334 is similar to that in the first example embodiment, and therefore, detailed description thereof is omitted.

The decryption unit 337 decrypts identification information by use of a decryption key associated with encryption used by the encryption unit 327.

Note that, when a method of encryption used by the encryption unit 327 is the same encryption as encryption used by the digital-signature generation unit 123, the receiver determination unit 334 may use a decryption function using the signature determination unit 133. Alternatively, in this case, the information processing device 320 may include the decryption unit 337 as an external component of the signature determination unit 133. In order to include this case, FIG. 11 connects the signature determination unit 133 and the decryption unit 337 by use of a dotted line.

Note that, when a device other than the verification device 330 acquires identification information included in a receiver-designation-access-token according to the third example embodiment, the device includes a component equivalent to the decryption unit 337, and may decrypt identification information.

Description of Advantageous Effect

The information processing device 320 according to the third example embodiment provides, in addition to the advantageous effect according to the first example embodiment, an advantageous effect of being able to protect identification information of a receiver, and further acquire identification information in a predetermined device.

A reason for this is that the policy generation unit 322 encrypts identification information by use of the encryption unit 327, and generates a policy including the encrypted identification information.

Fourth Example Embodiment

Identification information included in a receiver-designation-access-token can be used to acquire information relating to a receiver. For example, a receiver may falsely use a receiver-designation-access-token.

Thus, an information processing system 400 including an extraction device 410 which extracts information relating to a receiver by use of a receiver-designation-access-token is described as a fourth example embodiment.

The extraction device 410 is used for, for example, tracking of a fraudulent person falsely transmitting a receiver-designation-access-token. Therefore, in the following description, the extraction device 410 operates by receiving, from a verification device 430, a receiver-designation-access-token determined to be false. However, an operation of the extraction device 410 is not limited to a case of receiving a receiver-designation-access-token from a verification device 430. For example, the extraction device 410 may receive a receiver-designation-access-token from the information processing device 120 which has received notification from the verification device 430.

Description of Configuration

A configuration of the information processing system 400 according to the fourth example embodiment is described with reference to the drawings.

Figure 12:
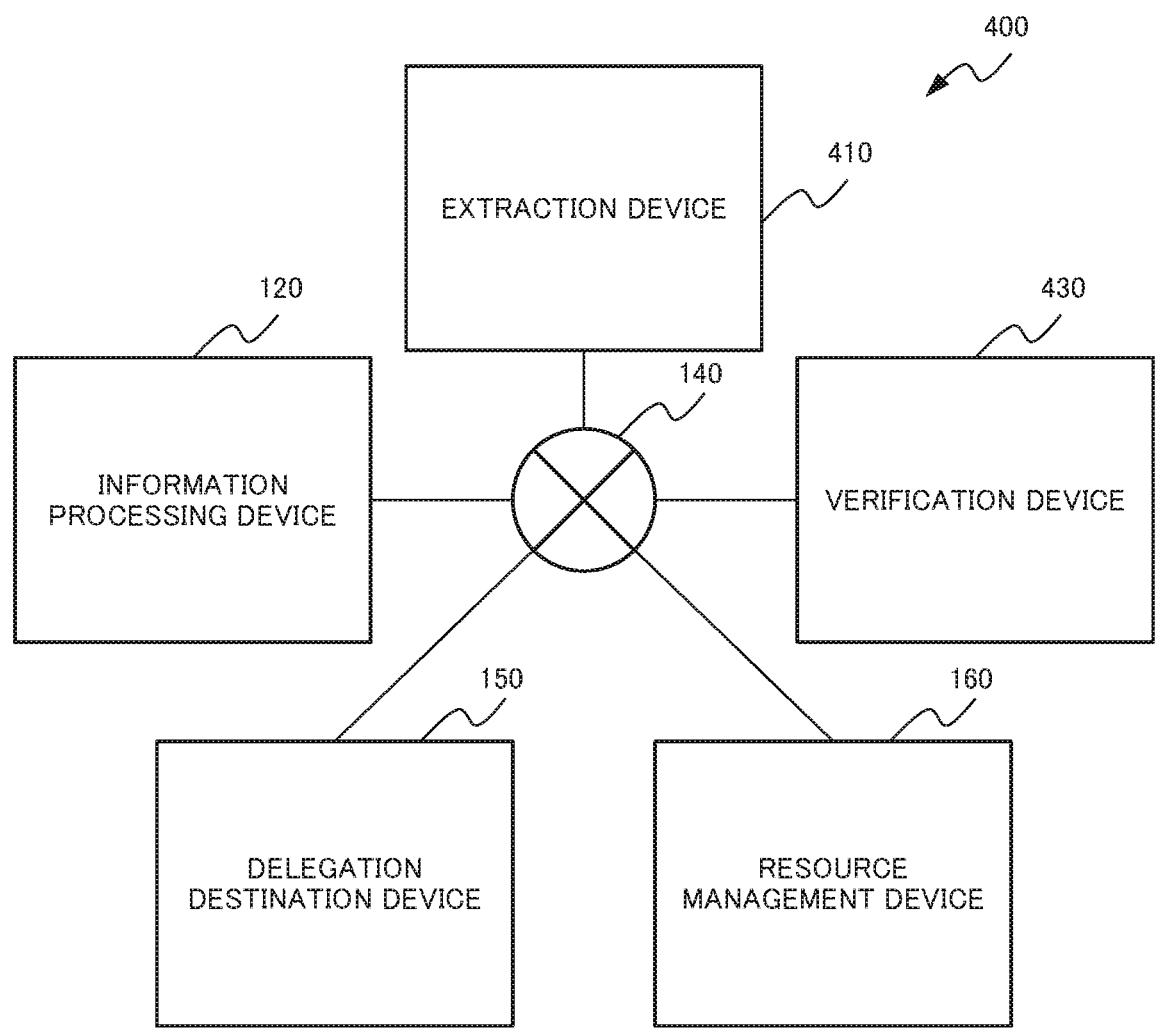
FIG. 12 is a block diagram illustrating one example of a configuration of an information processing system according to a fourth example embodiment.

FIG. 12 is a block diagram illustrating one example of the configuration of the information processing system 400 according to the fourth example embodiment.

The information processing system 400 includes the information processing device 120, the verification device 430, a network 140, a delegation destination device 150, a resource management device 160, and the extraction device 410. The network 140, the delegation destination device 150, the resource management device 160, and the information processing device 120 are similar to those in the first example embodiment, and therefore, detailed description thereof is omitted.

Next, a configuration of each device is described with reference to the drawings.

Figure 13:
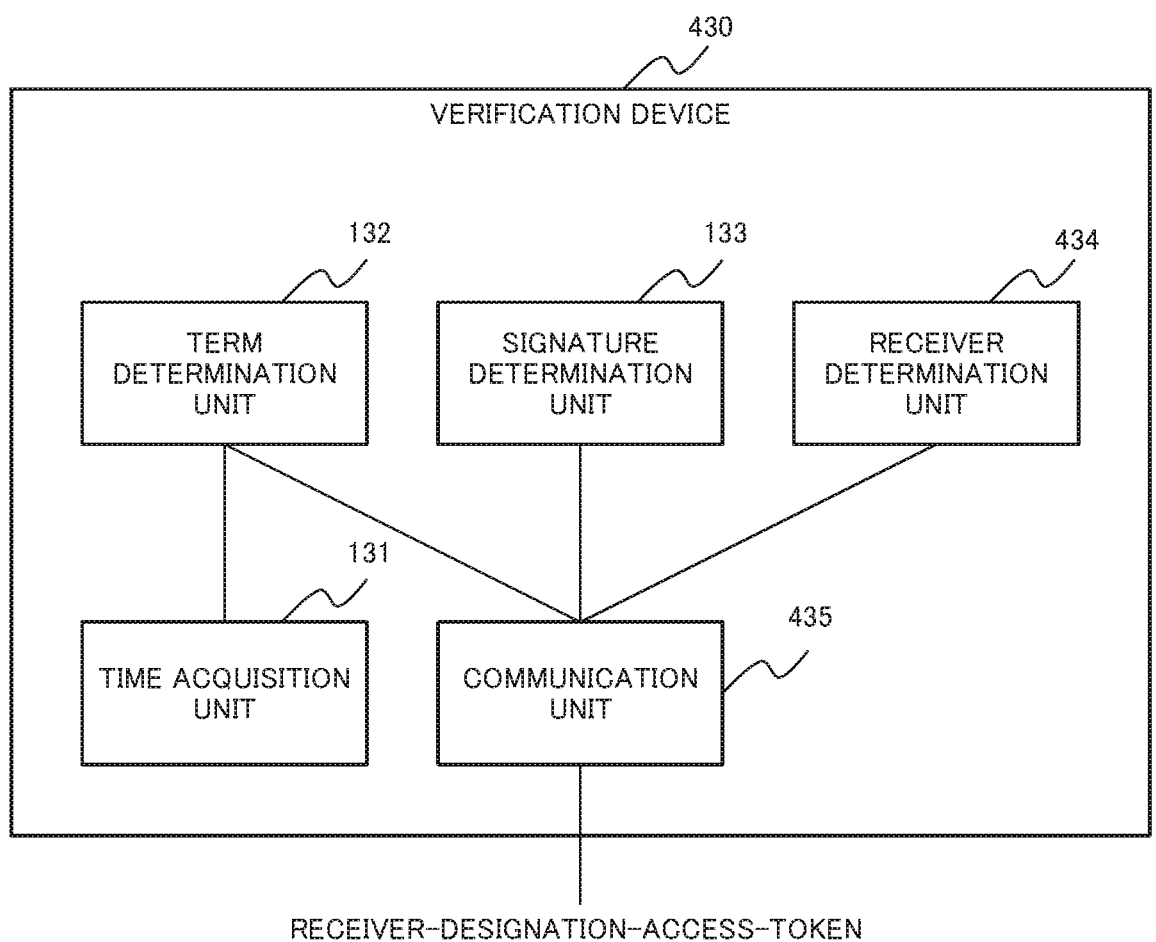
FIG. 13 is a block diagram illustrating one example of a configuration of a verification device according to the fourth example embodiment.

FIG. 13 is a block diagram illustrating one example of a configuration of the verification device 430 according to the fourth example embodiment.

The verification device 430 is different from the verification device 130 according to the first example embodiment in including a receiver determination unit 434 and a communication unit 435 instead of the receiver determination unit 134 and the communication unit 135. Description of a component similar to that according to the first example embodiment is suitably omitted, and a configuration specific to the fourth example embodiment is described.

The receiver determination unit 434 operates in a way similar to the receiver determination unit 134. Then, the receiver determination unit 434 transmits a receiver-designation-access-token determined to be false distribution, to the extraction device 410 via the communication unit 435.

The communication unit 435 transmits, to the extraction device 410, the receiver-designation-access-token received from the receiver determination unit 434, in addition to an operation similar to that of the communication unit 135.

Figure 14:
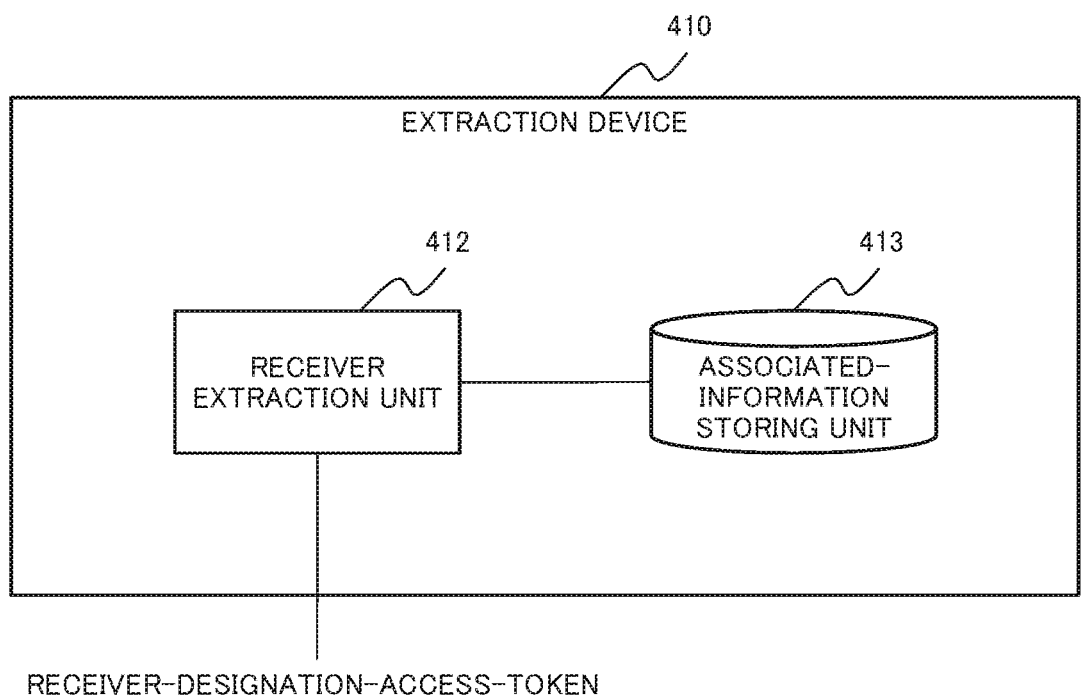
FIG. 14 is a block diagram illustrating one example of a configuration of an extraction device according to the fourth example embodiment.

FIG. 14 is a block diagram illustrating one example of a configuration of the extraction device 410 according to the fourth example embodiment.

The extraction device 410 includes a receiver extraction unit 412 and an associated-information storing unit 413.

The associated-information storing unit 413 stores identification information, and information (e.g., an address, a telephone number, a name, or belonging) relating to a receiver associated with the identification information, in association with each other.

The receiver extraction unit 412 extracts, by use of the information stored in the associated-information storing unit 413, information relating to a receiver associated with identification information included in a received receiver-designation-access-token.

The verification device 430 may transmit, to the extraction device 410, a receiver-designation-access-token determined to be invalid by the term determination unit 132 and the signature determination unit 133, in addition to transmission based on a determination result by the receiver determination unit 434.

Further, when the information processing system 400 includes the information processing device 220 instead of the information processing device 120, the associated-information storing unit 413 may store a hash value, and information related to the hash value.

Alternatively, when the information processing system 400 includes the information processing device 320 instead of the information processing device 120, the extraction device 410 may include a configuration similar to that of the decryption unit 337. Then, the receiver extraction unit 412 may decrypt encrypted identification information by use of the configuration, and operate by use of the decrypted identification information.

Description of Advantageous Effect

The information processing system 400 according to the fourth example embodiment provides, in addition to the advantageous effect according to the first example embodiment, an advantageous effect of acquiring information relating to a receiver associated with identification information included in a receiver-designation-access-token.

A reason for this is that the extraction device 410 extracts information related to a receiver by use of identification information included in a receiver-designation-access-token.

Hardware Configuration

Hardware of each of the information processing devices 120, 220, and 320 described above is described by use of the information processing device 120.

The information processing device 120 described above is configured as follows. For example, each constitutional unit of the information processing device 120 may be configured by a hardware circuit. Moreover, in the information processing device 120, each constitutional unit may be configured by use of a plurality of devices connected via a network. Further, in the information processing device 120, a plurality of constitutional units may be configured by one piece of hardware.

Furthermore, the information processing device 120 may be implemented as a computer device including a central processing unit (CPU), a read only memory (ROM), and a random access memory (RAM). The information processing device 120 may be implemented as a computer device further including an input and output circuit (IOC) in addition to the components described above. Alternatively, the information processing device 120 may be implemented as a computer device including a network interface circuit (NIC) in addition to the components described above.

Figure 15:
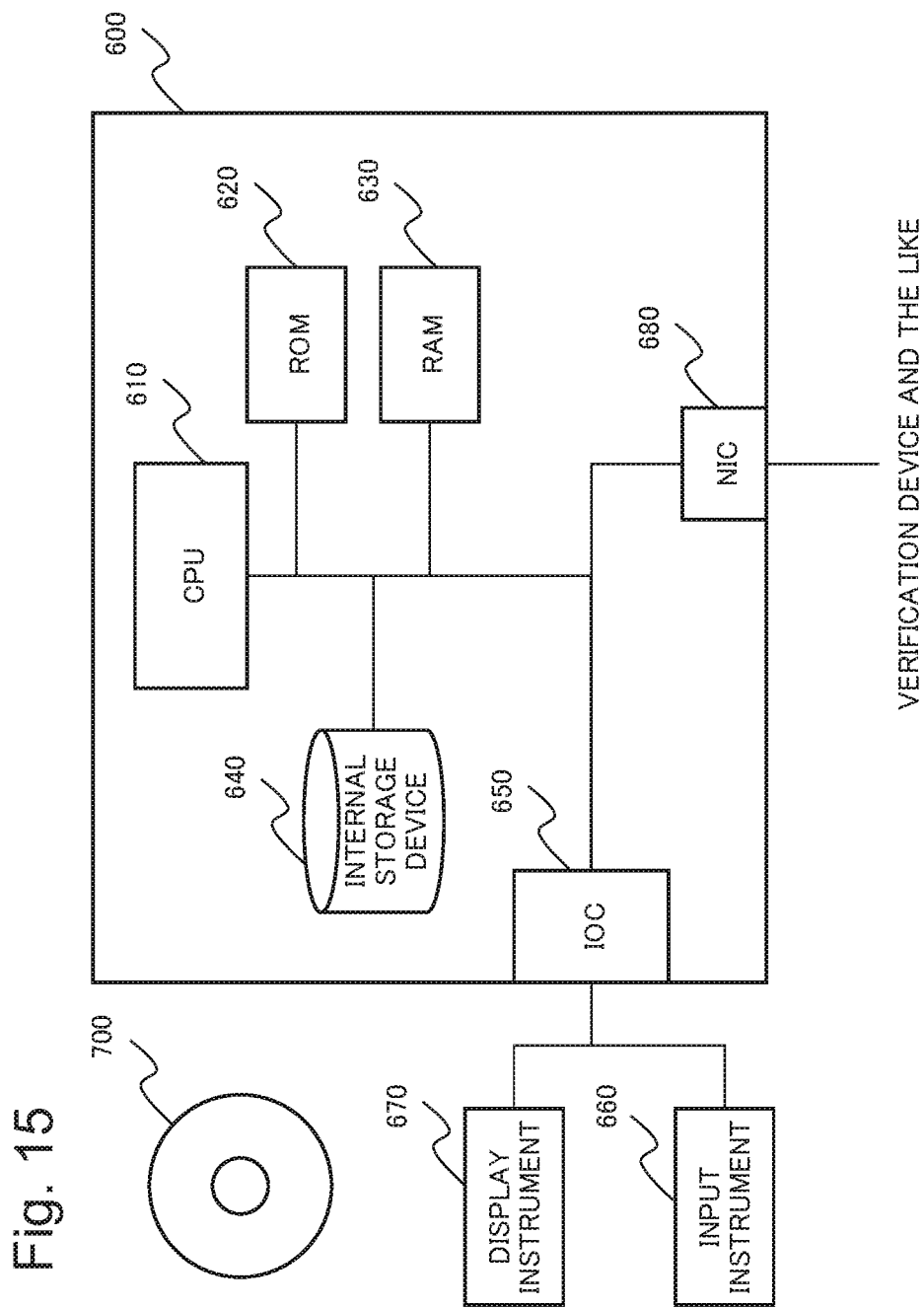
FIG. 15 is a block diagram illustrating one example of a hardware configuration of an information processing device.
Figure 16:
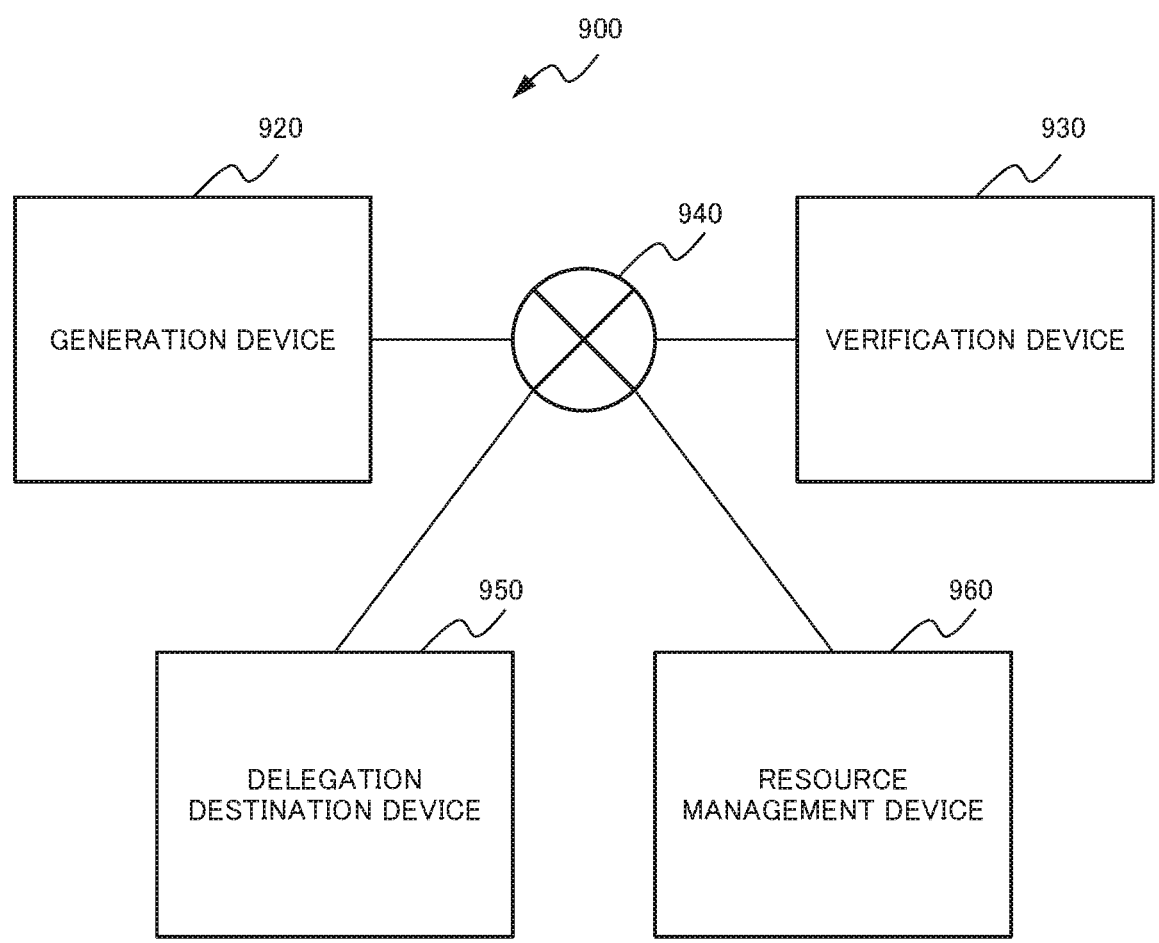
FIG. 16 is a block diagram illustrating one example of a configuration of a general access token system.
Figure 17:
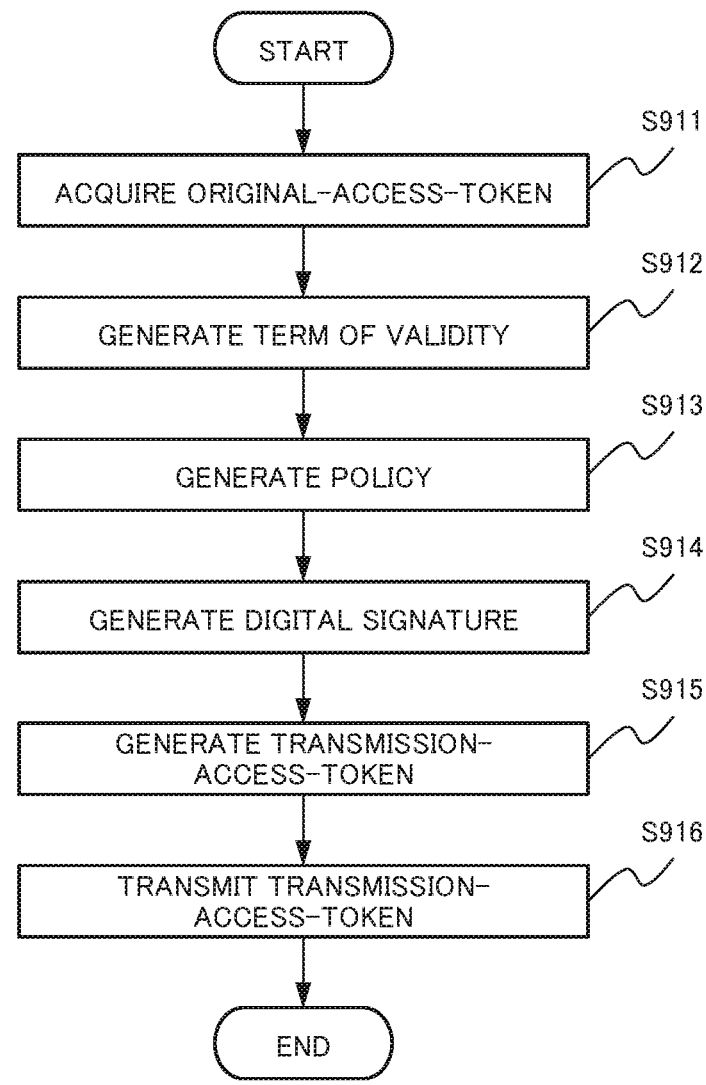
FIG. 17 is a flowchart for describing an operation of a general generation device.

FIG. 15 is a block diagram illustrating one example of a configuration of an information processing device 600 as a hardware configuration associated with the information processing device 120.

The information processing device 600 includes a CPU 610, a ROM 620, a RAM 630, an internal storage device 640, an IOC 650, and an NIC 680, and constitutes a computer device.

The CPU 610 reads a program from the ROM 620. Then, based on the read program, the CPU 610 controls the RAM 630, the internal storage device 640, the IOC 650, and the NIC 680. Then, a computer including the CPU 610 controls these components, and implements the function as each of the time acquisition unit 121, the policy generation unit 122, the digital-signature generation unit 123, the access-token generation unit 124, and the transmission unit 125 which are illustrated in FIG. 1.

When implementing each function, the CPU 610 may use the RAM 630 or the internal storage device 640 as a temporary storage medium of a program.

Furthermore, the CPU 610 may read, by use of a non-illustrated storage medium reading device, a program included in a storage medium 700 computer-readably storing the program. Alternatively, the CPU 610 may receive a program from a non-illustrated external device via the NIC 680, store the program in the RAM 630 or the internal storage device 640, and then operate based on the stored program.

The ROM 620 stores a program executed by the CPU 610, and fixed data. The ROM 620 is, for example, a programmable-ROM (P-ROM) or a flash ROM.

The RAM 630 temporarily stores a program executed by the CPU 610, and data. The RAM 630 is, for example, a dynamic RAM (D-RAM).

The internal storage device 640 stores data and a program stored for a long time by the information processing device 600. Moreover, the internal storage device 640 may operate as a temporary storage device of the CPU 610. The internal storage device 640 is, for example, a hard disk device, a magneto-optical disk device, a solid state drive (SSD), or a disk array device.

Herein, the ROM 620 and the internal storage device 640 are non-transitory storage media. On the other hand, the RAM 630 is a transitory storage medium. Then, the CPU 610 is operable based on a program stored in the ROM 620, the internal storage device 640, or the RAM 630. In other words, the CPU 610 is operable by use of a non-transitory storage medium or a transitory storage medium.

The IOC 650 mediates data between the CPU 610, and an input instrument 660 and a display instrument 670. The IOC 650 is, for example, an IO interface card or a universal serial bus (USB) card. Moreover, the IOC 650 is not limited to a wired form such as a USB, but may use a wireless form.

The input instrument 660 is an instrument which receives an input instruction from an operator of the information processing device 600. The input instrument 660 is, for example, a keyboard, a mouse, or a touch panel.

The display instrument 670 is an instrument which displays information to the operator of the information processing device 600. The display instrument 670 is, for example, a liquid crystal display.

The NIC 680 relays exchange of data with a non-illustrated external device (e.g., the verification device 130) via a network. The NIC 680 is, for example, a local area network (LAN) card. Moreover, the NIC 680 is not limited to a wired form, but may use a wireless form.

The information processing device 600 configured in this way can acquire an advantageous effect similar to that of the information processing device 120.

A reason for this is that the CPU 610 of the information processing device 600 can implement a function similar to that of the information processing device 120, based on a program.

Note that the verification devices 130, 230, 330, and 430, the delegation destination device 150, the resource management device 160, and/or the extraction device 410 may be each configured by a computer illustrated in FIG. 15.

While the invention has been particularly shown and described with reference to example embodiments thereof, the invention is not limited to these embodiments. It will be understood by those of ordinary skill in the art that various changes in form and details may be made therein without departing from the spirit and scope of the present invention as defined by the claims.

INDUSTRIAL APPLICABILITY

The present invention is applicable to an access token device which securely delegates authority to a user outside a system in an infrastructure as a service. Moreover, the present invention is applicable to a program for implementing an access token system by use of a computer.

REFERENCE SIGNS LIST

100 Information processing system
120 Information processing device
121 Time acquisition unit
122 Policy generation unit
123 Digital-signature generation unit
124 Access-token generation unit
125 Transmission unit
130 Verification device
131 Time acquisition unit
132 Term determination unit
133 Signature determination unit
134 Receiver determination unit
135 Communication unit
140 Network
150 Delegation destination device
160 Resource management device
200 Information processing system
220 Information processing device
222 Policy generation unit
226 Hash-value calculation unit
230 Verification device
234 Receiver determination unit
300 Information processing system
320 Information processing device
322 Policy generation unit
327 Encryption unit
330 Verification device
334 Receiver determination unit
337 Decryption unit
400 Information processing system
410 Extraction device
412 Receiver extraction unit
413 Associated-information storing unit
430 Verification device
434 Receiver determination unit
435 Communication unit
600 Information processing device
610 CPU
620 ROM
630 RAM
640 Internal storage device
650 IOC
660 Input instrument
670 Display instrument
680 NIC
700 Storage medium
900 Access token system
920 Generation device
930 Verification device
940 Network
950 Delegation destination device
960 Resource management device

What is claimed is:

1. A verification device comprising:
a memory storing instructions; and
at least one processor configured to execute the instructions to perform:

receiving second access token from another device;
acquiring a second time;
determining, based on a term of validity included in the second access token and the second time, whether or not the second access token is valid;
determining, based on a digital signature included in the second access token, whether or not the second access token is valid;
determining, based on identification information included in the second access token, whether or not the second access token is falsely distributed; and
determining that the second access token is falsely distributed when the second access tokens having the same pieces of identification information are received more than a predetermined threshold within a predetermined period.

2. The verification device according to claim 1, wherein the at least one processor is configured to execute the instructions further to perform determining that the second access token is falsely distributed when the second access tokens having the same pieces of identification information are received from a plurality of devices physically situated at locations a predetermined distance or more away.

3. An information processing system comprising:
an information processing device including
a first memory storing first instructions; and
at least one first processor configure to execute the first instructions to perform:
acquiring a first time,
generating, based on the first time, a term of validity of a first access token, and generating a policy including the first access token, the term of validity, and identification information of a receiver of the first access token,
generating a digital signature, based on the policy,
generating a second access token including the policy and the digital signature, and
transmitting the second access token to a delegation destination device; and
a verification device including
a second memory storing second instructions; and
at least one second processor configure to execute the second instructions to perform:
receiving the second access token from a resource management device that is received the second access token from the delegation destination device,
acquiring a second time,
determining, based on the term of validity included in the second access token, and the second time, whether or not the second access token is valid,
determining, based on the digital signature included in the second access token, whether or not the second access token is valid,
determining, based on identification information included in the second access token, whether or not the second access token is falsely distributed, and
determining that the second access token is falsely distributed when the second access tokens having the same pieces of identification information are received more than a predetermined threshold within a predetermined period.

4. The information processing system according to claim 3, further comprising
an extraction device including
a third memory storing third instructions; and
at least one third processor configured to execute the third instruction to perform:
storing the identification information, and information relating to the receiver associated with the identification information in association with each other, and
extracting information relating to the receiver, based on the identification information included in the second access token, wherein the at least second one processor is configured to execute the second instructions to perform
transmitting, to the extraction device, the second access token determined to be falsely distributed.

5. A verification method comprising:
receiving second access token from another device;
acquiring a second time;
determining, based on a term of validity included in the second access token and the second time, whether or not the second access token is valid;
determining, based on a digital signature included in the second access token, whether or not the second access token is valid;
determining, based on identification information included in the second access token, whether or not the second access token is falsely distributed; and
determining that the second access token is falsely distributed when the second access tokens having the same pieces of identification information are received more than a predetermined threshold within a predetermined period.

* * * * *